US012787108B2

(12) United States Patent
Kung et al.

(10) Patent No.: US 12,787,108 B2
(45) Date of Patent: Nov. 3, 2026

(54) METHOD AND APPARATUS FOR HANDLING SIDELINK DISCONTINUOUS RECEPTION REGARDING PERIODIC TRANSMISSION IN A WIRELESS COMMUNICATION SYSTEM

(71) Applicant: ASUSTek Computer Inc., Taipei City (TW)

(72) Inventors: Yi-Hsuan Kung, Taipei City (TW); Ming-Che Li, Taipei City (TW); Li-Chih Tseng, Taipei City (TW); Chun-Wei Huang, Taipei City (TW)

(73) Assignee: ASUSTek Computer Inc., Taipei City (TW)

( * ) Notice: Subject to any disclaimer, the term of this patent is extended or adjusted under 35 U.S.C. 154(b) by 0 days.

(21) Appl. No.: 17/940,877

(22) Filed: Sep. 8, 2022

(65) Prior Publication Data

US 2023/0007728 A1 Jan. 5, 2023

Related U.S. Application Data

(63) Continuation of application No. 17/154,816, filed on Jan. 21, 2021, now abandoned.

(Continued)

(51) Int. Cl.
*H04W 76/28* (2018.01)
*H04W 72/20* (2023.01)

(52) U.S. Cl.
CPC ........... *H04W 76/28* (2018.02); *H04W 72/20* (2023.01)

(58) Field of Classification Search
None
See application file for complete search history.

(56) References Cited

U.S. PATENT DOCUMENTS

2007/0041343 A1* 2/2007 Barreto ................. H04W 76/12 370/329
2007/0211663 A1* 9/2007 Jiang ..................... H04W 28/10 370/335

(Continued)

FOREIGN PATENT DOCUMENTS

CN 101547079 A 9/2009
CN 101635957 A 1/2010

(Continued)

OTHER PUBLICATIONS

Office Action to the corresponding Chinese Patent Application rendered by the State Intellectual Property Office (SIPO) on Nov. 23, 2023, 12 pages.

(Continued)

*Primary Examiner* — Jamaal Henson
(74) *Attorney, Agent, or Firm* — Skaar Ulbrich Macari, P.A.

(57) ABSTRACT

A method and device are disclosed from the perspective of a first device. In one embodiment, the method includes the first device being configured with a Sidelink (SL) Discontinuous Reception (DRX) configuration. The method also includes the first device performing a sidelink communication with a second device. The method further includes the first device receiving a signaling, from the second device, indicating a new sidelink transmission. In addition, the method includes the first device determining whether to start or restart a timer in response to the signaling at least based on information indicated in the signaling, wherein the first device monitors sidelink control channel when the timer is running.

18 Claims, 15 Drawing Sheets

Related U.S. Application Data

(60) Provisional application No. 62/964,022, filed on Jan. 21, 2020.

(56) References Cited

U.S. PATENT DOCUMENTS

| | | | | |
|---|---|---|---|---|
| 2011/0237231 | A1 | 9/2011 | Horneman et al. | |
| 2014/0348046 | A1 | 11/2014 | Feng et al. | |
| 2015/0109619 | A1 | 4/2015 | Sugimoto et al. | |
| 2016/0119970 | A1 | 4/2016 | Lee et al. | |
| 2016/0135735 | A1 | 5/2016 | Bowers et al. | |
| 2016/0360475 | A1 | 12/2016 | Lindoff et al. | |
| 2016/0366645 | A1* | 12/2016 | Song | H04W 52/0229 |
| 2017/0295601 | A1* | 10/2017 | Kim | H04W 72/20 |
| 2018/0110085 | A1 | 4/2018 | Tseng | |
| 2018/0139772 | A1 | 5/2018 | Ozturk et al. | |
| 2018/0213594 | A1 | 7/2018 | You et al. | |
| 2019/0174411 | A1* | 6/2019 | Xu | H04W 52/0216 |
| 2019/0239160 | A1 | 8/2019 | Lee et al. | |
| 2020/0120466 | A1* | 4/2020 | Rajagopal | H04L 67/12 |
| 2020/0344722 | A1* | 10/2020 | He | H04L 5/0055 |
| 2021/0243749 | A1* | 8/2021 | Hoang | H04W 72/02 |
| 2021/0306952 | A1 | 9/2021 | Kuang et al. | |
| 2022/0030552 | A1* | 1/2022 | Li | H04W 72/0453 |
| 2022/0255680 | A1* | 8/2022 | Moon | H04L 5/0055 |
| 2022/0312241 | A1* | 9/2022 | Xu | H04L 1/1822 |
| 2022/0346011 | A1* | 10/2022 | Hong | H04W 52/02 |
| 2022/0358409 | A1* | 11/2022 | Neumann | G06N 20/00 |
| 2022/0369417 | A1* | 11/2022 | Park | H04W 52/0216 |
| 2022/0385409 | A1* | 12/2022 | Park | H04L 1/0026 |
| 2022/0394810 | A1* | 12/2022 | Hong | H04W 72/23 |
| 2023/0024646 | A1* | 1/2023 | Park | H04W 76/28 |
| 2023/0034294 | A1* | 2/2023 | Zhang | H04W 52/0216 |

FOREIGN PATENT DOCUMENTS

| | | | | |
|---|---|---|---|---|
| CN | 102655668 A | | 9/2012 | |
| CN | 105722195 A | | 6/2016 | |
| CN | 110392380 A | | 10/2019 | |
| EP | 3595229 A1 | | 1/2020 | |
| WO | 2018232321 A2 | | 12/2018 | |
| WO | WO-2021003693 A1 | * | 1/2021 | H04W 4/40 |
| WO | WO-2021119474 A1 | * | 6/2021 | H04W 72/0406 |

OTHER PUBLICATIONS

OPPO; R2-1914462 "Left issues on CSI report for NR-V2X"; Nov. 8, 2019; 3 pages.

Rafael Molina-Masegosa et al.; An IEEE 802.11p-Assisted LTE-V Scheduling for Reliable Multi-Link V2X Communications; Oct. 9, 2018; 5 pages.

"TDoc_List_Meeting_RAN2#103-Bis"; Nov. 13, 2018; 488 pages.

Gu Wen; "A Study of Relay Selection Algorithms Based on D2D Communication"; Thesis Submitted to Nanjing University of Posts and Telecommunications for the Degree of Master of Engineering; Feb. 2013; 64 pages.

* cited by examiner

| Resource reservation field in SCI format 1 | Indicated value $X$ | Condition |
|---|---|---|
| '0001', '0010', …, '1010' | Decimal equivalent of the field | The higher layer decides to keep the resource for the transmission of the next transport block and the value $X$ meets $1 \leq X \leq 10$. |
| '1011' | 0.5 | The higher layer decides to keep the resource for the transmission of the next transport block and the value $X$ is 0.5. |
| '1100' | 0.2 | The higher layer decides to keep the resource for the transmission of the next transport block and the value $X$ is 0.2. |
| '0000' | 0 | The higher layer decides not to keep the resource for the transmission of the next transport block. |
| '1101', '1110', '1111' | Reserved | |

FIG. 5 (PRIOR ART)

METHOD AND APPARATUS FOR HANDLING SIDELINK DISCONTINUOUS RECEPTION REGARDING PERIODIC TRANSMISSION IN A WIRELESS COMMUNICATION SYSTEM

CROSS-REFERENCE TO RELATED APPLICATIONS

This application is a Continuation of U.S. patent application Ser. No. 17/154,816, filed Jan. 21, 2021, which claims the benefit of U.S. Provisional Patent Application Ser. Nos. 62/964,022 filed on Jan. 21, 2020, the entire disclosure of which is incorporated herein in its entirety by references.

FIELD

This disclosure generally relates to wireless communication networks, and more particularly, to a method and apparatus for handling sidelink discontinuous reception regarding periodic transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first device. In one embodiment, the method includes the first device being configured with a Sidelink (SL) Discontinuous Reception (DRX) configuration. The method also includes the first device performing a sidelink communication with a second device. The method further includes the first device receiving a signaling, from the second device, indicating a new sidelink transmission. In addition, the method includes the first device determining whether to start or restart a timer in response to the signaling at least based on information indicated in the signaling, wherein the first device monitors sidelink control channel when the timer is running.

BRIEF DESCRIPTION OF THE DRAWINGS

FIG. 5 is a reproduction of Table 14.2.1-2 of 3GPP TS 36.213 V15.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.321, V15.7.0, "Medium Access Control (MAC) protocol specification"; RP-193257, "WID on SL enhancement"; Running CR to 38.321 for 5G V2X with NR sidelink; Draft Report of 3GPP TSG RAN WG1 #99 v0.1.0 (Reno, USA, 18-22 Nov. 2019); R1-1913642, "Introduction of 5G V2X sidelink features into TS 38.212", Huawei; and TS 36.213, V15.4.0, "E-UTRA; Physical layer procedures". The standards and documents listed above are hereby expressly incorporated by reference in their entirety.

Figure 1:
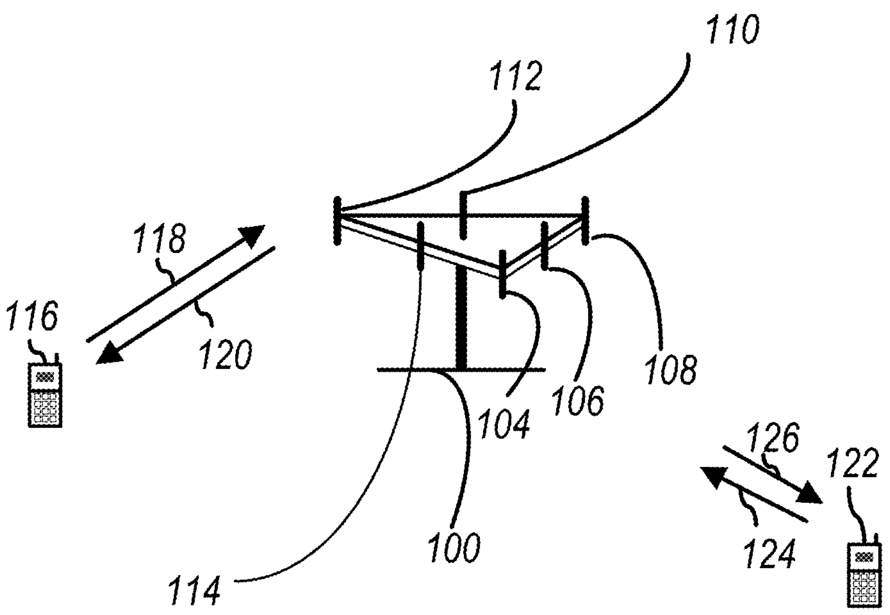
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
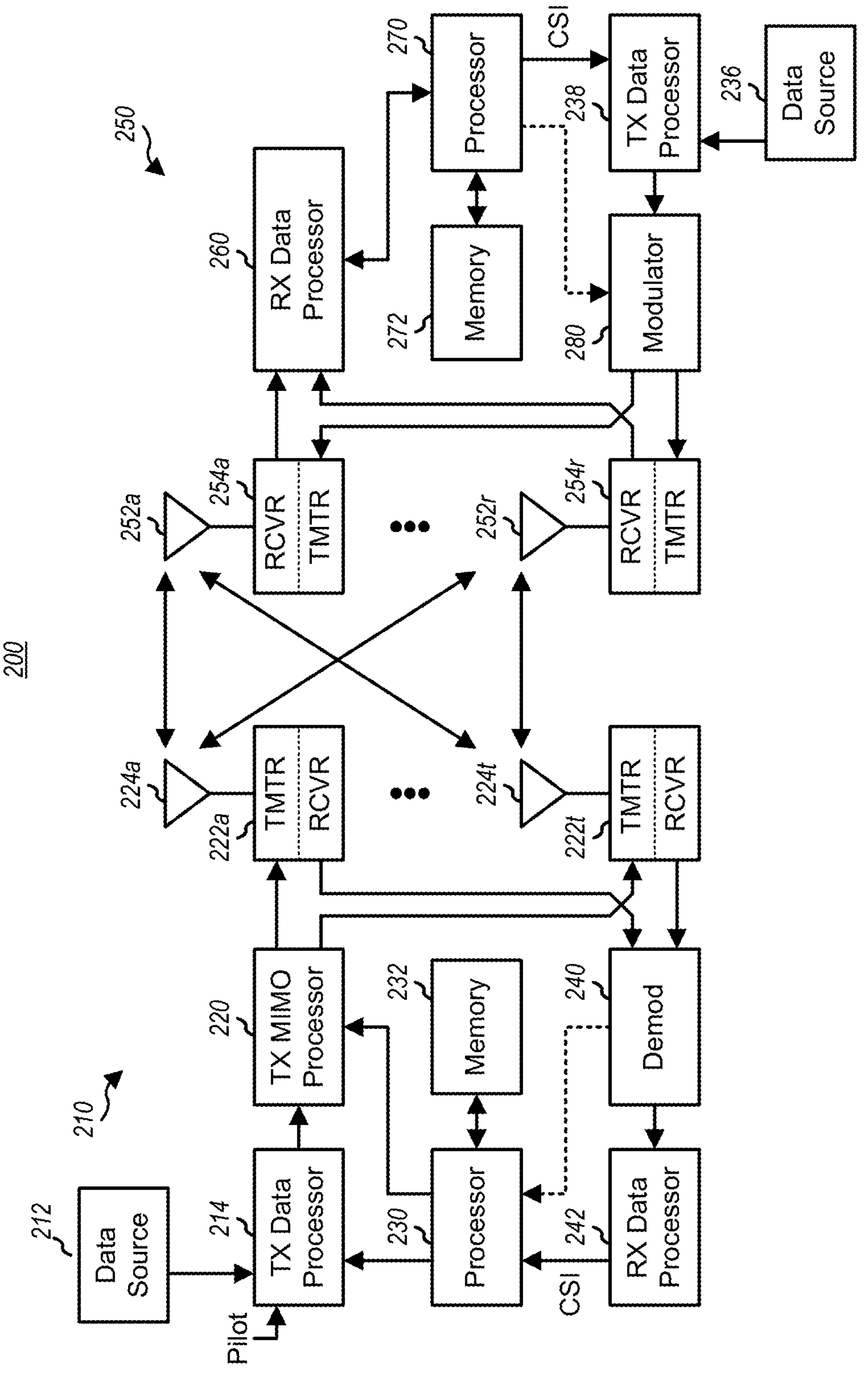
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
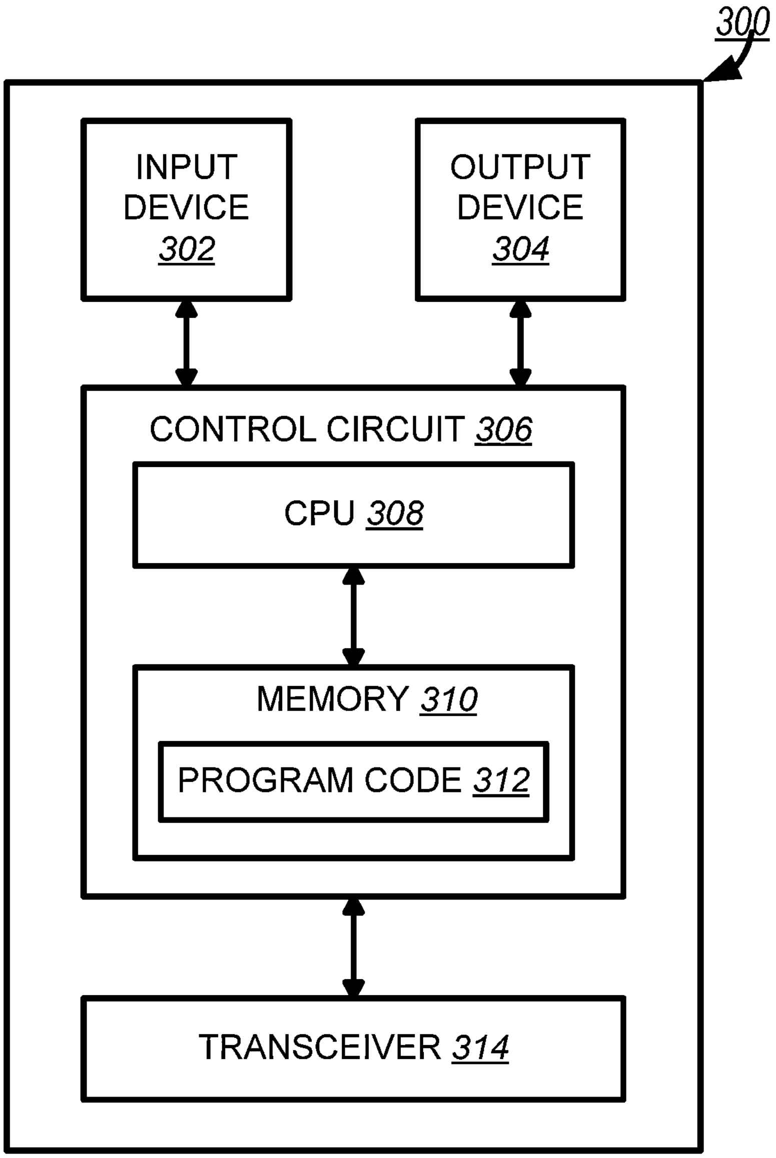
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
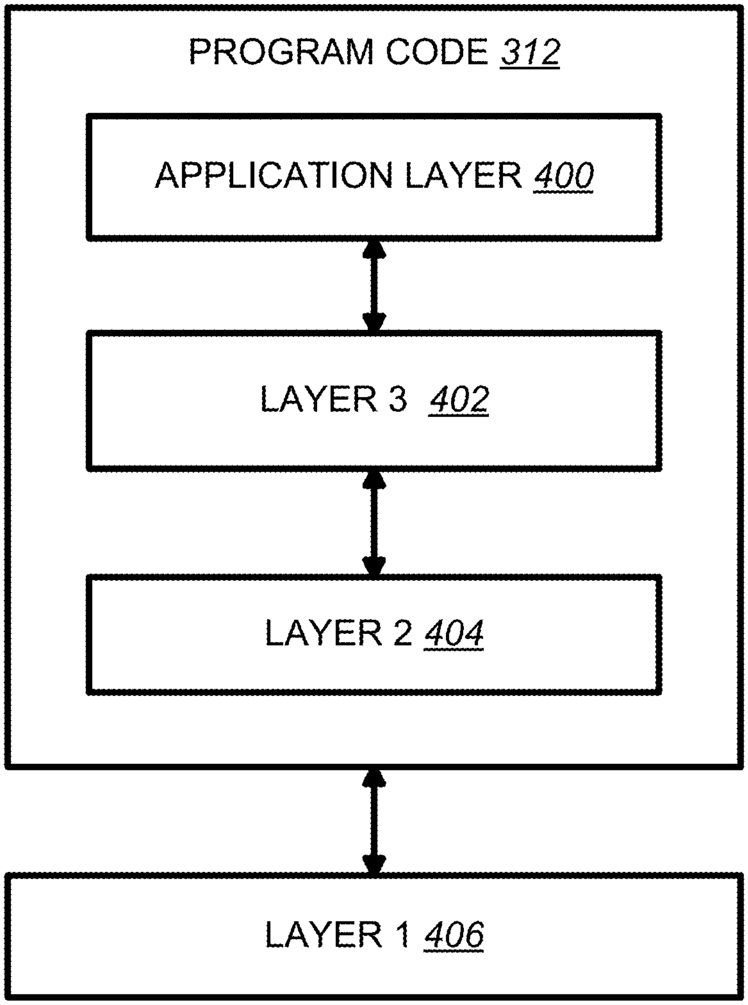
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In 3GPP TS 38.321, Discontinuous Reception (DRX) is introduced as follows:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:

- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.

When a DRX cycle is configured, the Active Time includes the time while:

- drx-onDurationTimer or drx-InactivityTimer or drx-RetransmissionTimerDL or drx-Retransmission TimerUL or ra-ContentionResolutionTimer (as described in clause 5.1.5) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall;

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-Retransmission TimerDL for the corresponding HARQ process.
1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-Retransmission TimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer;
  2> stop drx-InactivityTimer.
1> if drx-InactivityTimer expires or a DRX Command MAC CE is received:
  2> if the Short DRX cycle is configured:
    3> start or restart drx-ShortCycle Timer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+subframe number] modulo (drx-ShortCycle)=(drx-StartOffset) modulo (drx-ShortCycle); or
1> if the Long DRX Cycle is used, and [(SFN×10)+subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.

2> if the PDCCH indicates a new transmission (DL or UL):

3> start or restart drx-InactivityTimer in the first symbol after the end of the PDCCH reception.

1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:

2> not transmit periodic SRS and semi-persistent SRS defined in TS 38.214 [7];

2> not report CSI on PUCCH and semi-persistent CSI on PUSCH.

1> if CSI masking (csi-Mask) is setup by upper layers:

2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:

3> not report CSI on PUCCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

In RP-193257 Work item for sidelink enhancement [2], DRX for sidelink is introduced:

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #88) [RAN1]

Note: TR 37.885 is reused for the other evaluation assumption and performance metric. Vehicle dropping model B and antenna option 2 shall be a more realistic baseline for highway and urban grid scenarios.

2. Resource allocation enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial [RAN1, RAN2]

Inter-UE coordination with the following until RAN #88.

A set of resources is determined at UE-A. This set is sent to UE-B in mode 2, and UE-B takes this into account in the resource selection for its own transmission.

Note: The study scope after RAN #88 is to be decided in RAN #88.

Note: The solution should be able to operate in-coverage, partial coverage, and out-of-coverage and to address consecutive packet loss in all coverage scenarios.

Note: RAN2 work will start after RAN #89.

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE:

In the Running CR for 38.321 for 5G V2X, sidelink communication is introduced as follows:

5.x SL-SCH Data Transfer 5.x.1 SL-SCH Data Transmission 5.x.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSSCH duration(s) in which transmission of SCI occurs and a set of PSSCH duration(s) in which transmission of SL-SCH associated with the SCI occurs.

If the MAC entity has a SL-RNTI or SLCS-RNTI, the MAC entity shall for each PDCCH occasion and for each grant received for this PDCCH occasion:

1> if a sidelink grant has been received on the PDCCH for the MAC entity's SL-RNTI:

2> store the sidelink grant as configured sidelink grant;

2> use the received sidelink grant to determine the set of PSCCH durations and the set of PSSCH durations for one or more (re-)transmissions of a single MAC PDU according to [38.2xx];

1> else if a sidelink grant has been received on the PDCCH for the MAC entity's SLCS-RNTI:

2> if PDCCH contents indicate configured grant Type 2 deactivation for a configured sidelink grant:

3> clear the configured sidelink grant, if available;

3> trigger configured sidelink grant confirmation for the configured sidelink grant;

2> else if PDCCH contents indicate configured grant Type 2 activation for a configured sidelink grant:

3> trigger configured sidelink grant confirmation for the configured sidelink grant;

3> store the configured sidelink grant;

3> initialise or re-initialise the configured sidelink grant to determine the set of PSCCH durations and the set of PSSCH durations for transmissions of multiple MAC PDUs according to [xx].

Editor's Note: FFS whether SLCG-RNTI can be used for allocation of retransmission resource in RAN1.

If the MAC entity is configured by RRC to transmit using pool(s) of resources in a carrier as indicated in TS 38.331 [5] or TS 36.331 [xy] based on sensing, [or random selection], the MAC entity shall for each Sidelink process:

1> if the MAC entity selects to create a configured sidelink grant corresponding to transmissions of multiple MAC PDUs, and SL data is available in a logical channel:

2> perform the TX resource (re-)selection check as specified in clause 5.x.1.2;

2> if the TX resource (re-)selection is triggered as the result of the TX resource (re-)selection check;

3> randomly select, with equal probability, an integer value in the interval [TBD] for the resource reservation interval in the interval [TBD] and set [SL_RESOURCE_RESELECTION_COUNTER] to the selected value;

Editor's Note: RAN2 assumes that SL_RESOURCE_RESELECTION_COUNTER is specified for Sidelink Mode 2 in 38.321as in 36.321. This assumption needs to be confirmed by RAN1.

3> select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;

3> select an amount of frequency resources within the range that is configured by upper layers between [minSubchannel-NumberPSSCH] and [maxSubchannel-NumberPSSCH] included in [pssch-TxConfigList] and, if configured by upper layers, overlapped between [minSubchannel-NumberPSSCH] and [maxSubchannel-NumberPSSCH] indicated in [cbr-pssch-TxConfig-List] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available];

3> randomly select the time and frequency resources for one transmission opportunity from the resources indicated by the physical layer according to TS 36.2xx [xx], according to the amount of selected frequency resources.

3> use the randomly selected resource to select a set of periodic resources spaced by the resource reservation interval for transmissions of PSCCH and PSSCH corresponding to the number of transmission opportunities of MAC PDUs determined in TS 38.2xx [xx];

3> if one or more HARQ retransmissions are selected:

4> if there are available resources left in the resources indicated by the physical layer according to TS 38.2xx [xx] for more transmission opportunities:

5> randomly select the time and frequency resources for one or more transmission opportunities from the available resources, according to the amount of selected frequency resources and the selected number of HARQ retransmissions;

5> use the randomly selected resource to select a set of periodic resources spaced by the resource reservation interval for transmissions of PSCCH and PSSCH corresponding to the number of retransmission opportunities of the MAC PDUs determined in TS 38.2xx [xx];

5> [consider the first set of transmission opportunities as the new transmission opportunities and the other set of transmission opportunities as the retransmission opportunities;]

Editor's Note: FFS how retransmission opportunities are determined.

5> consider the set of new transmission opportunities and retransmission opportunities as the selected sidelink grant.

3> else:

4> consider the set as the selected sidelink grant;

3> use the selected sidelink grant to determine the set of PSCCH durations and the set of PSSCH durations according to TS 38.2xx [xx];

3> consider the selected sidelink grant to be a configured sidelink grant.

1> if the MAC entity selects to create a configured sidelink grant corresponding to transmission(s) of a single MAC PDU, and SL data is available in a logical channel:

2> perform the TX resource (re-)selection check as specified in clause 5.x.1.2;

2> if the TX resource (re-)selection is triggered as the result of the TX resource (re-)selection check;

3> select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;

3> select an amount of frequency resources within the range that is configured by upper layers between [minSubchannel-NumberPSSCH] and [maxSubchannel-NumberPSSCH] included in [pssch-TxConfigList] and, if configured by upper layers, overlapped between [minSubchannel-NumberPSSCH] and [maxSubchannel-NumberPSSCH] indicated in [cbr-pssch-TxConfig-List] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;

3> randomly select the time and frequency resources for one transmission opportunity from the resources indicated by the physical layer according to TS 38.2xx [xx], according to the amount of selected frequency resources.

3> if one or more HARQ retransmissions are selected:

4> if there are available resources left in the resources indicated by the physical layer according to TS 38.2xx [xx] for more transmission opportunities:

5> randomly select the time and frequency resources for one or more transmission opportunities from the available resources, according to the amount of selected frequency resources and the selected number of HARQ retransmissions;

5> [consider a transmission opportunity which comes first in time as the new transmission opportunity and a transmission opportunity which comes later in time as the retransmission opportunity];

5> consider both of the transmission opportunities as the selected sidelink grant;

3> else:

4> consider the set as the selected sidelink grant;

3> use the selected sidelink grant to determine PSCCH duration(s) and PSSCH duration(s) according to TS 38.2xx [xx];

3> consider the selected sidelink grant to be a configured sidelink grant.

The MAC entity shall for each PSSCH duration:

1> for each configured sidelink grant occurring in this PSSCH duration:

2> deliver the sidelink grant to the Sidelink HARQ Entity for this PSSCH duration.

5.x.1.2 TX Resource (Re-)Selection Check

If the TX resource (re-)selection check procedure is triggered for a Sidelink process according to clause 5.x.1.1, the MAC entity shall for the Sidelink process:

1> if [SL_RESOURCE_RESELECTION_COUNTER=0]; or

Editor's Note: FFS on need of additional condition triggering TX resource (re-)selection.

1> if a pool of resources is configured or reconfigured by upper layers; or

1> if there is no configured sidelink grant; or

1> if the configured sidelink grant cannot accommodate a RLC SDU [by using the maximum allowed MCS configured by upper layers in maxMCS-PSSCH] and the MAC entity selects not to segment the RLC SDU; or NOTE: If the configured sidelink grant cannot accommodate the RLC SDU, it is left for UE implementation whether to perform segmentation or sidelink resource reselection.

1> if transmission(s) with the configured sidelink grant cannot fulfil the latency requirement of the data in a logical channel according to the associated priority, and the MAC entity selects not to perform transmission(s) corresponding to a single MAC PDU; or NOTE: If the latency requirement is not met, it is left for UE implementation whether to perform transmission(s) corresponding to single MAC PDU or sidelink resource reselection.

1> if a sidelink transmission is scheduled by any received SCI indicating a higher priority than the priority of the logical channel and expected to overlap with a resource of the configured sidelink grant, and a measured result on SL-RSRP associated with the sidelink transmission is higher than [threshold]:

2> clear the configured sidelink grant associated to the Sidelink process, if available;

2> trigger the TX resource (re-)selection.

5.x.1.3 Sidelink HARQ Operation 5.x.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is [TBD1]. A sidelink process may be configured for transmissions of multiple MAC PDUs. For transmissions of multiple MAC PDUs, the maximum number of transmitting Sidelink processes associated with the Sidelink HARQ Entity is [TBD2].

Editor's Note: For transmissions of multiple MAC PDUs, TBD2 value is smaller than TBD1 value.

A delivered sidelink grant and its associated HARQ information are associated with a Sidelink process. Each Sidelink process supports one TB.

Editor's Note: FFS on need of specifying how HARQ information is generated, if currently missing in this CR.

For each sidelink grant, the Sidelink HARQ Entity shall:

Editor's Note: FFS whether a sidelink grant is used for initial transmission or retransmission is up to UE implementation for SL mode 2 and dynamic grant in RAN1.

1> if the MAC entity determines that the sidelink grant is used for initial transmission, and if no MAC PDU has been obtained:

NOTE: For the configured grant Type 1 and 2, whether a sidelink grant is used for initial transmission or retransmission is up to UE implementation.

Editor's Note: RAN1 agreed that UE decides which TB to transmit in each of the occasions indicated by a given configured grant. RAN2 can revisit if the above NOTE is not aligned with the RAN1 agreement.

2> associate a Sidelink process to this grant, and for each associated Sidelink process:

3> obtain the MAC PDU to transmit from the Multiplexing and assembly entity, if any;

3> if a MAC PDU to transmit has been obtained:

4> deliver the MAC PDU, the sidelink grant and the HARQ information and the QoS information of the TB to the associated Sidelink process;

4> instruct the associated Sidelink process to trigger a new transmission;

3> else:

4> flush the HARQ buffer of the associated Sidelink process.

1> else (i.e. retransmission):

2> identify the Sidelink process associated with this grant, and for each associated Sidelink process:

3> if a positive acknowledgement to a transmission of the MAC PDU has been received according to clause 5.x.1.3.3; or 3> if only a negative acknowledgement is configured and no negative acknowledgement is for the most recent (re-)transmission of the MAC PDU according to clause 5.x.1.3.3:

4> clear the sidelink grant;

4> flush the HARQ buffer of the associated Sidelink process;

3> else:

Editor's Note: FFS on need of checking additional conditions to trigger a HARQ retransmission e.g. based on the maximum number of retransmissions.

4> deliver the sidelink grant and HARQ information and QoS information of the MAC PDU to the associated Sidelink process;

4> instruct the associated Sidelink process to trigger a retransmission.

5.x.1.3.2 Sidelink Process

The Sidelink process is associated with a HARQ buffer.

New transmissions and retransmissions are performed on the resource indicated in the sidelink grant as specified in clause 5.x.1.1 and with the MCS selected as specified in [clause 5.x.1.1].

If the sidelink process is configured to perform transmissions of multiple MAC PDUs the process maintains [a counter SL_RESOURCE_RESELECTION_COUNTER]. For other configurations of the sidelink process, this counter is not available.

If the Sidelink HARQ Entity requests a new transmission, the Sidelink process shall:

1> consider the NDI to have been toggled for the Sidelink process;

1> store the MAC PDU in the associated HARQ buffer;

1> associate the Sidelink process to a HARQ Process ID for the Source Layer-2 ID and Destination Layer-2 ID pair of the MAC PDU for one of unicast, groupcast and [broadcast] which is associated to the pair;

NOTE: How UE determine HARQ process ID is left to UE implementation for NR sidelink.

1> store the sidelink grant received from the Sidelink HARQ Entity;

1> generate a transmission as described below;

If the Sidelink HARQ Entity requests a retransmission, the Sidelink process shall:

1> consider the NDI not to have been toggled for the Sidelink process;

1> generate a transmission as described below;

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or Editor's Note: In the above text, the other MAC entity corresponds to at least E-UTRA MAC entity performing the uplink transmission(s) in (NG) EN-DC. FFS on support of the other cases.

1> if there is a MAC PDU to be transmitted for this duration in uplink, except a MAC PDU obtained from the Msg3 buffer or having logical channel(s) of which the value of the highest priority is lower than [thresUL-TxPrioritization], if configured, and the sidelink transmission is prioritized over uplink transmission:

2> instruct the physical layer to transmit SCI according to the stored sidelink grant with the associated HARQ information including the values of the NDI and the HARQ Process ID and the associated QoS information including the value of the highest priority of the logical channel(s) in the MAC PDU;

NOTE: The initial value of the NDI set to the very first transmission for the Sidelink HARQ Entity is left to UE implementation.

2> instruct the physical layer to generate a transmission according to the stored sidelink grant;

2> if HARQ feedback is configured for a logical channel from which a MAC SDU is included in the MAC PDU:

3> instructs the physical layer to monitor PSFCH for the transmission as specified in TS 38.2xx [x].

1> if this transmission corresponds to the last transmission of the MAC PDU:

2> decrement [SL_RESOURCE_RESELECTION-_COUNTER] by 1, if available.

The transmission of the MAC PDU is prioritized over uplink transmissions of the MAC entity or the other MAC entity if the following conditions are met:

1> if the MAC entity is not able to perform this sidelink transmission simultaneously with all uplink transmissions at the time of the transmission, and 1> if uplink transmission is not prioritized by upper layer according to TS [24.386] [xx]; and 1> if the value of the highest priority of the logical channel(s) in the MAC PDU is lower than [thresSL-TxPrioritization] if [thresSL-TxPrioritization] is configured.

5.x.1.3.3 PSFCH Reception

The MAC entity shall for each PSSCH transmission:

1> if an acknowledgement corresponding to the transmission in clause 5.x.1.3.2 is obtained from the physical layer:

2> deliver the acknowledgement to the corresponding Sidelink HARQ entity for the Sidelink process;

1> else:

2> deliver a negative acknowledgement to the corresponding Sidelink HARQ entity for the Sidelink process;

1> if the MAC entity has a SL-RNTI or SLCS-RNTI and a valid PUCCH resource configured for [sidelink acknowledgement]:

2> instruct the physical layer to signal the PUCCH according to TS 38.2xx [x].

5.x.2 SL-SCH Data Reception 5.x.2.1 SCI Reception

SCI indicate if there is a transmission on SL-SCH and provide the relevant HARQ information. A SCI consists of two parts: an initial part of the SCI on PSCCH and the remaining part of the SCI on PSSCH as specified in [x].

Editor's Note: FFS on support of a single SCI in RAN1 e.g. for broadcast.

The MAC entity shall:

1> for each PSCCH duration during which the MAC entity monitors PSCCH:

2> if an initial part of a SCI for this PSSCH duration has been received on the PSCCH:

3> determine the set of PSSCH durations in which reception of the remaining part of the SCI and the transport block occur using the received part of the SCI;

3> if the remaining part of the SCI for this PSSCH duration has been received on the PSSCH:

4> store the SCI as SCI valid for the PSSCH durations corresponding to transmission(s) of the transport block and the associated HARQ information and QoS information;

1> for each PSSCH duration for which the MAC entity has a valid SCI:

2> deliver the SCI and the associated HARQ information and QoS information to the Sidelink HARQ Entity.

5.x.2.2 Sidelink HARQ Operation 5.x.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in [TBD].

For each PSSCH duration, the Sidelink HARQ Entity shall:

1> for each SCI valid for this PSSCH duration:

2> if this PSSCH duration corresponds to new transmission opportunity according to this SCI:

3> allocate the TB received from the physical layer and the associated HARQ information to an unoccupied Sidelink process, associate the Sidelink process with this SCI and consider this transmission to be a new transmission.

1> for each Sidelink process:

2> if this PSSCH duration corresponds to retransmission opportunity for the Sidelink process according to its associated SCI:

3> allocate the TB received from the physical layer and the associated HARQ information to the Sidelink process and consider this transmission to be a retransmission.

5.14.2.2.2 Sidelink Process

For each PSSCH duration where a transmission takes place for the Sidelink process, one TB and the associated HARQ information is received from the Sidelink HARQ Entity.

For each received TB and associated HARQ information, the Sidelink process shall:

1> if this is a new transmission:

2> attempt to decode the received data.

1> else if this is a retransmission:

2> if the data for this TB has not yet been successfully decoded:

3> instruct the physical layer to combine the received data with the data currently in the soft buffer for this TB and attempt to decode the combined data.

1> if the data which the MAC entity attempted to decode was successfully decoded for this TB; or 1> if the data for this TB was successfully decoded before:

2> if this is the first successful decoding of the data for this TB and [if the DST field of the decoded MAC PDU subheader is equal to the [x] MSB of any of the Destination Layer-2 ID(s) of the UE for which the [y] LSB are equal to the Destination ID in the corresponding SCI]:

Editor's Note: FFS for details of packet filtering.

3> deliver the decoded MAC PDU to the disassembly and demultiplexing entity;

3> consider the Sidelink process as unoccupied.

1> else:

2> instruct the physical layer to replace the data in the soft buffer for this TB with the data which the MAC entity attempted to decode.

1> if HARQ feedback is configured with [a separate PSFCH resource i.e. option 2] for the Sidelink process; or 1> if HARQ feedback corresponding to this TB is configured with [a shared PSFCH resource i.e. option 1] and the communication range calculated based on the SCI valid for this PSSCH duration according to [TS 38.xxx] is smaller or equal to the requirement indicated in the SCI valid for this PSSCH duration:

2> instruct the physical layer to generate acknowledgement(s) of the data in this TB.

In the Draft Report of 3GPP TSG RAN WG1 #99 V0.1.0, a Sidelink Control Information (SCI) can reserve a (future) one or more opportunity for sidelink transmission delivering different Transport Block (TB). Possible values of the reserved periodicity or period value could be as discussed below:

Agreements:

On a per resource pool basis, when reservation of a sidelink resource for an initial transmission of a TB at least by an SCI associated with a different TB is enabled:

A period is additionally signalled in SCI and the same reservation is applied with respect to resources indicated within $N_{MAX}$ within window W at subsequent periods A set of possible period values is the following: 0, [1:99], 100, 200, 300, 400, 500, 600, 700, 800, 900, 1000 ms <=4 bits are used in SCI to indicate a period.

An actual set of values is (pre-) configured

Regarding the number of periods

The number of remaining periodic reservations is not explicitly indicated in SCI

[ . . . ]

Agreements:

At least the following parameters are part of a SL configured grant configuration:

Configuration index of the CG

Time offset (for type-1 only)

Time-frequency allocation (for type-1 only)

Using the same format as in DCI.

Periodicity

The configured grant is associated with a single transmit resource pool.

RAN2 can add other parameters if deemed necessary by RAN2

A UE in mode 1 is configured at least with one transmit resource pool.

For type-2 CG, the time-frequency allocation and the configuration index of the CG are indicated in DCI.

All parameters for CG type 2 for activation DCI re-use the same respective parameters configured for CG type 1, when applicable

[ . . . ]

Agreements:

The first proposal under Wed. session in R1-1913450 is agreed, with one clarification that S is the number of sub-channels in the resource pool.

For mode 1 and mode 2, for the time-frequency resource indication in the SCI:

$N_{MAX}$=2

Frequency $$\sum_{m=1}^{S}(S+1-m)=\frac{S(S+1)}{2}$$

code-points, indicating starting sub-channel of the second resource and number of sub-channels of both resources $$\left\lceil \log_2\left(\frac{S(S+1)}{2}\right)\right\rceil \text{ bit}$$

Time 1 code-point indicates no reserved resource 31 code-points indicate different time position of the second resource within 32 slots 5 bit $N_{MAX}$=3

Frequency

Option 2-f-a: joint coding $$\sum_{m=1}^{S}(S+1-m)^2=\frac{S(S+1)(2S+1)}{6}$$

code-points indicating starting sub-channel of the second resource, starting sub-channel of the third resource, and the number of sub-channels of all resources $$\left\lceil \log_2\left(\frac{S(S+1)(2S+1)}{6}\right)\right\rceil \text{ bit}$$

Time

Option 2-t-a: joint coding 1 code-point indicates no reserved resource 31 code-points indicate different time position of the second resource within 32 slots, when no third resource is reserved 30+29+ . . . +1=465 code-points indicate different time position of two resources within 32 slots 9 bit In 3GPP R1-1913642, a running CR of NR sidelink V2X for SCI field and related DCI field is provided as follows:

7.3.1.4 DCI Formats for Scheduling of Sidelink 7.3.1.4.1 Format 3_0

DCI format 3_0 is used for scheduling of NR PSCCH and NR PSSCH in one cell. The following information is transmitted by means of the DCI format 3_0 with CRC scrambled by SL-RNTI or SL-CS-RNTI:

Time gap—[x] bits determined by higher layer parameter timeGapFirstSidelinkTransmission, as defined in subclause x.x.x of [6, TS 38.214]

HARQ process ID—[x] bits as defined in subclause x.x.x of [6, TS 38.214]

New data indicator—1 bit as defined in subclause x.x.x of [6, TS 38.214]

Lowest index of the subchannel allocation to the initial transmission—

$$\left\lceil \log_2\left(N_{subchannel}^{SL}\right)\right\rceil$$

bits as defined in subclause x.x.x of [6, TS 38.214]

SCI format 0-1 fields according to subclause 8.3.1.1:

Frequency resource assignment.

Time resource assignment.

PSFCH-to-HARQ feedback timing indicator—3 bits as defined in subclause x.x.x of [6, TS 38.214].

PUCCH resource indicator—3 bits as defined in subclause x.x.x of [6, TS 38.214].

Configuration index—0 bit if the UE is not configured to monitor DCI format 3_0 with CRC scrambled by SL-CS-RNTI; otherwise [x] bits as defined in subclause x.x.x of [6, TS 38.214]. If the UE is configured to monitor DCI format 3_0 with CRC scrambled by SL-CS-RNTI, this field is reserved for DCI format 3_0 with CRC scrambled by SL-RNTI.

8.3.1.1 SCI Format 0-1

SCI format 0-1 is used for the scheduling of PSSCH and $2^{nd}$-stage-SCI on PSSCH The following information is transmitted by means of the SCI format 0-1:

Priority—3 bits as defined in subclause x.x.x of [6, TS 38.214].

Frequency resource assignment—

$$\left\lceil \log_2\left(\frac{N_{subchannel}^{SL}\left(N_{subchannel}^{SL}+1\right)}{2}\right)\right\rceil$$

bits when the value of the higher layer parameter maxNumResource is configured to 2; otherwise $$\left\lceil \log_2\left(\frac{N_{subchannel}^{SL}\left(N_{subchannel}^{SL}+1\right)\left(2N_{subchannel}^{SL}+1\right)}{6}\right)\right\rceil$$

bits when the value of the higher layer parameter maxNumResource is configured to 3, as defined in subclause x.x.x of [6, TS 38.214].

Time resource assignment—5 bits when the value of the higher layer parameter maxNumResource is configured to 2; otherwise 9 bits when the value of the higher layer parameter maxNumResource is configured to 3, as defined in subclause x.x.x of [6, T$38.214].

Resource reservation period—$\lceil \log_2(N_{reservPeriod})\rceil$ bits as defined in subclause x.x.x of [6, TS 38.214], if higher parameter reserveResourceDifferentTB is configured; 0 bit otherwise.

DMRS pattern—[x] bits as defined in subclause x.x.x of [6, TS 38.214], if more than one DMRS patterns are configured by higher layer parameter TimePatternPsschDmrs; 0 bit otherwise.

$2^{nd}$-stage SCI format—[x] bits as defined in subclause x.x.x of [6, TS 38.214].

Beta_offset indicator—[2] bits as defined in subclause x.x.x of [6, TS 38.214].

Number of DMRS port—1 bit as defined in subclause x.x.x of [6, TS 38.214].

Modulation and coding scheme—5 bits as defined in subclause x.x.x of [6, TS 38.214].

Reserved—[2-4] bits as determined by higher layer parameter [XXX], with value set to zero.

In 3GPP TS 36.213, LTE sidelink V2X SPS related procedure is provided as follows:

14.1.1.4A UE Procedure for Determining Subframes and Resource Blocks for Transmitting PSSCH for Sidelink Transmission Mode 3

If the UE has a configured sidelink grant (described in [8]) in subframe $$t_n^{SL}$$

with the corresponding PSCCH resource m (described in Subclause 14.2.4), the resource blocks and subframes of the corresponding PSSCH transmissions are determined according to 14.1.1.4C. If the UE has a configured sidelink grant (described in [8]) for an SL SPS configuration activated by Subclause 14.2.1 and if a set of sub-channels in subframe $$t_m^{SL}$$

is determined as the time and frequency resource for PSSCH transmission corresponding to the configured sidelink grant (described in [8]) of the SL SPS configuration, the same set of sub-channels in subframes $$t_{m+j\times P'_{SPS}}^{SL}$$

are also determined for PSSCH transmissions corresponding to the same sidelink grant where $$j=1, 2, \ldots, P'_{SPS}=P_{step}\times P_{SPS}/100, \text{ and } (t_0^{SL}, t_1^{SL}, t_2^{SL}, \ldots)$$

is determined by Subclause 14.1.5. Here, $P_{SPS}$ is the sidelink SPS interval of the corresponding SL SPS configuration.

[ . . . ]

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $$(t_0^{SL}, t_1^{SL}, t_2^{SL}, \ldots)$$

and that starts not earlier than $$T_{DL}-\left(\frac{N_{TA}}{2}\right)\times T_S+(4+m)\times 10^{-3}.$$

$L_{Init}$ Is the value indicated by "Lowest index of the sub-channel allocation to the initial transmission" associated with the configured sidelink grant (described in [8]), $$(t_0^{SL}, t_1^{SL}, t_2^{SL}, \ldots)$$

is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $$t_{q+SF_{gap}}^{SL},$$

where $SF_{gap}$ is the value indicated by "Time gap between initial transmission and retransmission" field in the configured sidelink grant, subframe $$t_q^{SL}$$

corresponds to the subframe n+$k_{init}$. $L_{ReTX}$ corresponds to the value $$n_{subCH}^{start}$$

determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration; one transmission of PSCCH is in the PSCCH resource $L_{Init}$ (described in Subclause 14.2.4) in the first subframe that is included in $$(t_0^{SL}, t_1^{SL}, t_2^{SL}, \ldots)$$

and that starts not earlier than the first subframe that is included in $$T_{DL}-\left(\frac{N_{TA}}{2}\right)\times T_S+(4+m)\times 10^{-3}.$$

$L_{Init}$ is the value indicated by "Lowest index of the sub-channel allocation to the initial transmission" associated with the configured sidelink grant (described in [8]), $$(t_0^{SL}, t_1^{SL}, t_2^{SL}, \ldots)$$

is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t^{SL}_{q+SF_{gap}}$, where $SF_{gap}$ is the value indicated by "Time gap between initial transmission and retransmission" field in the configured sidelink grant, subframe $t^{SL}_{q}$ corresponds to the subframe $n+k_{init}$. $L_{ReTX}$ corresponds to the value $n^{start}_{subCH}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

Table 14.2.1-2 of 3GPP TS 36.213 V15.4.0, Entitled "Determination of the Resource Reservation Field in SCI Format 1", is Reproduced as FIG. 5

In work item for sidelink enhancement, Discontinuous Reception (DRX) on Sidelink is introduced. Therefore, it is needed to define timing duration(s) for a UE to monitor Physical Sidelink Control Channel (PSCCH), e.g. Sidelink Control Information (SCI). In NR Uu, a UE could discontinuously monitor Physical Downlink Control Channel (PDCCH) based on DRX configuration. The UE could monitor PDCCH when the UE is in active time. The UE may not monitor PDCCH when the UE is not in active time. The active time could include the time while:

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In NR Uu, drx-onDurationTimer is configured by a network and is started based on Short DRX Cycle or Long DRX Cycle configuration, drx-InactivityTimer is started or restarted if the PDCCH indicates a new transmission (e.g. DL or UL), drx-RetransmissionTimerUL is started after the expiry of drx-HARQ-RTT-TimerUL, and drx-RetransmissionTimerDL is started after the expiry of drx-HARQ-RTT-TimerDL.

In NR SL, a transmitter UE (Tx UE) could perform sidelink transmission to a receiver UE via sidelink resources selected by the Tx UE (e.g. via autonomous resource selection mode, mode-2) or sidelink resources indicated by a base station (e.g. via network scheduling mode, mode-1). For mode-1, the base station could configure the Tx UE with a configured grant for sidelink transmission (e.g. type-1 or type-2 configured grant for SL). The configured grant could be associated with a set of periodic SL resources. The Tx UE could perform sidelink transmission to the Rx UE via using SL resources associated with an (activated) configured grant.

In NR Uu, a UE does not need to monitor downlink control channel (e.g. PDCCH) to receive transmission via configured grant. However, in NR SL, a Rx UE may need to receive PSCCH for each PSSCH transmission including transmission from a Tx UE via configured grant for SL. Since the Tx UE needs to transmit PSCCH for each Physical Sidelink Shared Channel (PSSCH) transmission, which can assist surrounding UE(s) to perform sensing. Moreover, the Tx UE may indicate or update information about periodic resource reservation in sidelink control information. If the Rx UE applies SL DRX (e.g. a short or long DRX cycle) and if sidelink resources associated with a configured grant of the Tx UE does not align with active time associated with SL DRX of the Rx UE, the Rx UE may not be able to receive some (or all) of PSCCH or PSSCH transmissions from the Tx UE. The misalignment may be because of difference between periodicity of the configured grant and periodicity of the DRX cycle, and/or different time offsets between the configured grant and the DRX cycle.

Figure 6:
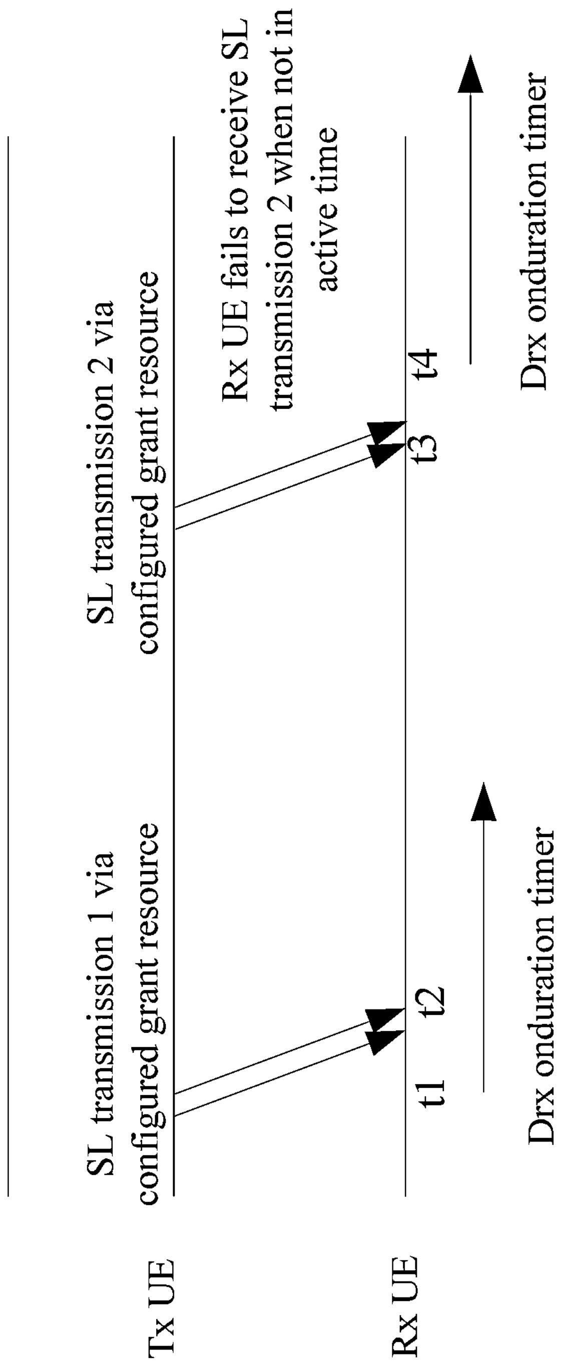
FIG. 6 is a diagram according to one exemplary embodiment.

An example of the issue is shown in FIG. 6. A Tx UE is configured by a base station with configured grant for sidelink and is activated by the base station. A Rx UE applies SL DRX configuration and starts drx on duration timer at t1. The Tx UE performs sidelink transmission 1 via SL resource (s) at t2 while the timer is still running. The Rx UE is in active time at t2 and receives SL transmission 1 (PSCCH and PSSCH). The Tx UE performs SL transmission 2 via another SL resource associated with the configured grant. However, RX UE is not in active time and may not monitor PSCCH. The Rx UE could start on duration timer at t4 (a timing after t3). The Rx UE may fail to receive SL transmission 2 due to not being in active time at t3.

Another issue could occur when a Rx UE receives a SCI indicating a new transmission associated with periodic communication (e.g. Sidelink (SL) Semi-Persistent Scheduling (SPS)) from a Tx UE in active time. According to NR Uu specification, a UE could start or restart a timer (e.g. drx-inactivitytimer) in response to receiving a PDCCH indicating a new transmission. The UE monitors the PDCCH when the timer is running. A purpose for the timer is for the UE to monitor other PDCCH indicating new transmission scheduled by a base station. If concept of the timer is reused for SL, and the Rx UE receives a SCI indicating new transmission from a Tx UE, the Rx UE could start or restart the timer in response to the reception of the SCI. However, if the SCI is associated with a periodic SL resource (e.g. SL SPS or mode-2 resources), the Tx UE may not indicate additional (or sequential) new transmissions after the new transmission since the periodic SL resource is reserved corresponding to a periodicity. The Rx UE may monitor unnecessary time duration and induce power wastage.

To solve the issue(s) mentioned above, one general concept of the invention is that a Rx UE could determine whether to monitor a sidelink control channel at a timing based on a sidelink information transmitted from a Tx UE. The Rx UE could determine to monitor the sidelink control channel at the timing regardless whether the Rx UE is in active time at the timing if the sidelink information indicates a first sidelink transmission (for the Rx UE) at the timing or if the sidelink formation indicates a (reserved) resource for a first sidelink transmission at the timing.

The timing could be associated with a first sidelink transmission from the Tx UE. The first sidelink transmission could be associated with a configured sidelink grant. The configured sidelink grant indicates, reserves, or corresponds to multiple (periodic) sidelink resources for transmissions of multiple Medium Access Control (MAC) Packet Data Units (PDUs). The first sidelink transmission could be associated with a Radio Resource Control (RRC) configuration indicating a set of PSSCH durations for transmissions of multiple MAC PDUs. The first sidelink transmission could be associated with a configured grant Type 2. The first sidelink transmission could be associated with a configured grant Type 1. The timing may not be associated with a dynamic sidelink grant or network scheduled sidelink grant. The timing may not be associated with a sidelink grant, which indicates, reserves, or corresponds to one or multiple sidelink resources for transmission(s) of one MAC PDU.

The sidelink information could be included in a specific Sidelink control information (SCI). The specific SCI could be associated with a previous sidelink transmission (e.g. different from the first sidelink transmission). The UE could determine the timing associated with the first sidelink transmission based on the sidelink information included in the specific SCI. The previous sidelink transmission could be associated with a same RRC configuration as the first sidelink transmission. The sidelink resource of the previous sidelink transmission and the sidelink resource of the first sidelink transmission are indicated, reserved, or associated with the same configured sidelink grant. In one embodiment, the previous sidelink transmission delivers, includes, or comprises different MAC PDU from the first sidelink transmission. In one embodiment, the first sidelink transmission is new or initial sidelink transmission, which delivers, includes, or comprises a new Transport Block (TB) or a new MAC PDU. The RRC configuration could be a configured grant configuration for SL (e.g. SL-ConfiguredGrantConfig)
.

The sidelink information could be a timing offset indicating the timing associated with the first sidelink information with respect to a previous timing. The previous timing could be associated with a reception of the specific SCI. Alternatively, the previous timing could be associated with reception of a MAC PDU associated with (or indicated by) the specific SCI. Alternatively, the previous timing could be associated with a first (system) frame number. In one embodiment, the sidelink information could be a resource reservation periodicity indicated in the specific SCI, while the resource reservation periodicity is not zero.

Figure 7:
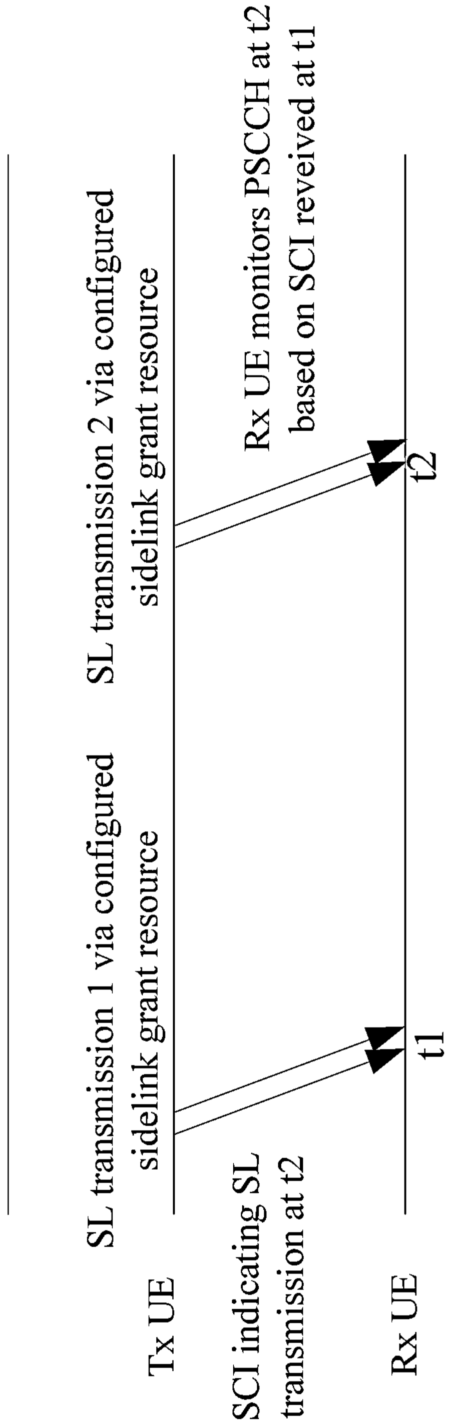
FIG. 7 is a diagram according to one exemplary embodiment.

An example is shown in FIG. 7. A Tx UE is configured with (and activated) a set of configured sidelink grant resources (e.g. configured grant type-2). The set of configured sidelink grant resources include sidelink resource at t1 and t2. The Tx UE performs SL transmission 1 to a Rx UE at t1. The SL transmission 1 includes transmitting a first SCI and a sidelink TB. The first SCI indicates a timing information (e.g. a timing offset or resource reservation periodicity in respect to t1) associated with a SL transmission 2. The first SCI indicates a (reserved) resource at t2 (wherein the resource is associated with a SL transmission 2). The Rx UE derives a timing t2 based on the first SCI. The Rx UE determines to monitor PSCCH at t2 based on the timing information indicated in the first SCI. The Rx UE could monitor the PSCCH at t2 regardless whether the Rx UE is in active time at t2 or not. The first SCI can be considered as the specific SCI. Alternatively, the SL transmission 1 and the SL transmission 2 could be selected by the Tx UE via autonomous resource selection (mode-2). The SL transmission 1 and the SL transmission 2 could deliver same or different TB or MAC PDU.

Additionally or alternatively, the Rx UE could be considered or could consider itself as being in active time at the timing associated with the first sidelink transmission. Additionally or alternatively, the Rx UE could start or restart a timer in response to the timing and/or in response to the reception of the sidelink information. The Rx UE monitors the sidelink control channel (e.g. PSCCH), or considers itself to be in active time when the timer is running.

Figure 8:
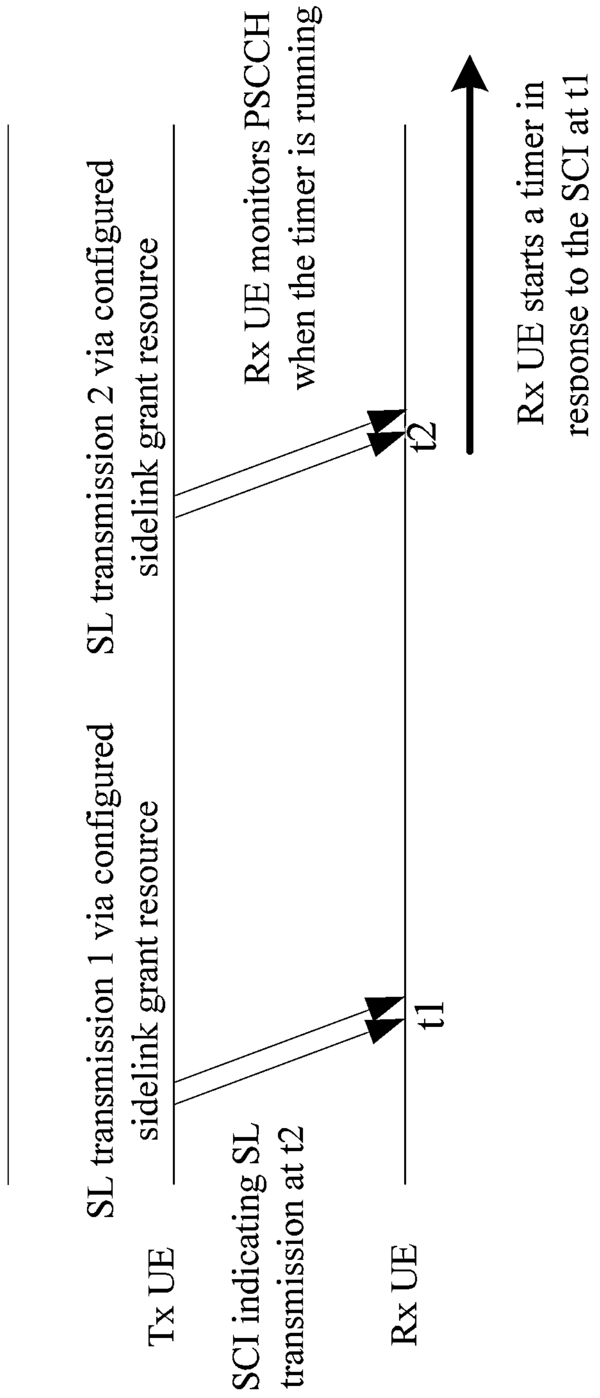
FIG. 8 is a diagram according to one exemplary embodiment.

An example is shown in FIG. 8. The Tx UE performs a SL transmission 1 at t1. The SL transmission 1 includes transmitting a SCI indicating or reserving a SL transmission 2 at t2 (e.g. SCI containing a timing offset or resource reservation periodicity with respect to t1.) The first SCI indicates a (reserved) resource at t2, wherein the resource may be associated with a SL transmission 2. The Rx UE derives a timing t2 that is associated with the SL transmission 2 based on the SCI and (re) starts a timer at the timing t2. Alternatively, the Rx UE (re) starts the timer at a timing x slots before t2, where x could be configured by a network or indicated by the Tx UE. The Rx UE monitors PSCCH when the timer is running and receives the SL transmission 2 at t2. The SL transmission 2 includes a SCI and a TB transmission.

The Rx UE could determine to monitor sidelink control channel at the timing if the Tx UE indicates a (possible) SL transmission at the timing. The Rx UE could determine to monitor sidelink control channel at the timing if a SCI transmitted by the Tx UE indicates a SL transmission at the timing.

Another general concept of the invention is that a Rx UE could determine whether to monitor a sidelink control channel at a timing based on at least one configuration of a Tx UE. The at least one configuration could be associated with at least one set of PSSCH durations for transmissions of multiple MAC PDUs (or TBs). The Tx UE could provide and/or indicate the at least one configurations of the Tx UE to the Rx UE. The Rx UE could determine one or more timing(s) to monitor PSCCH and/or PSSCH at least based on the at least one configurations of the Tx UE.

Another general concept of the invention is that a UE could determine whether to start or restart a timer when receiving a signaling indicating a new sidelink transmission at least based on whether the new sidelink transmission is associated with a set of (periodic) SL resources for transmissions of multiple TBs. The UE may not start or restart the timer if the new sidelink transmission is associated with a set of (periodic) SL resources for transmission of multiple TBs. The UE could start or restart the timer if the new sidelink transmission is associated with a SL resource for a single TB (e.g. a one-shot transmission).

The set of SL resources for transmission of multiple TBs could be associated with configured grant type-1 or type-2. Furthermore, the set of SL resources for transmission of multiple TBs could be associated with autonomous resource selection.

The UE could start or restart the timer if the signaling is associated with network scheduled mode. Alternatively or additionally, the UE could start or restart the timer if the signaling is associated with a transmission of a single TB.

Figure 9:
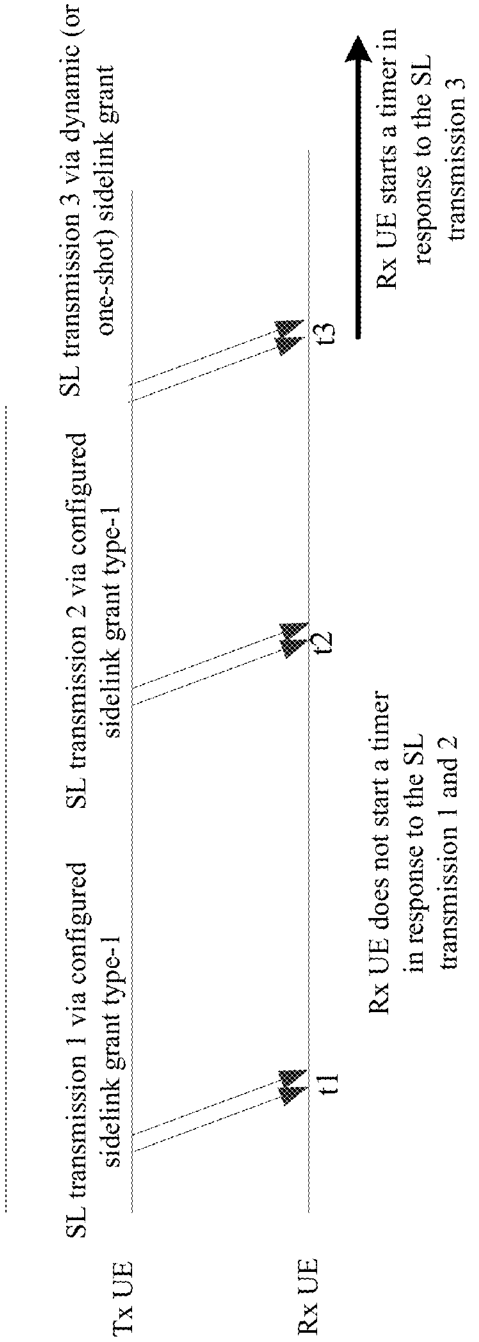
FIG. 9 is a diagram according to one exemplary embodiment.

An example is shown in FIG. 9. A Tx UE is configured with configured sidelink grant (e.g. type-1) via RRC. The Tx UE performs SL transmission 1 and SL transmission 2 (e.g. new transmission) via SL resources associated with the configured sidelink grant to a Rx UE. The Rx UE does not start a timer in response to the SL transmission 1 and SL transmission 2 since the SL transmission 1 and 2 are associated with periodic transmission (e.g. configured sidelink grant type-1). The Tx UE performs a SL transmission 3 (e.g. new transmission) at t3 via dynamic scheduled grant (e.g. one-shot sidelink grant scheduled by a base station) to the Rx UE. The Rx UE starts the timer in response to SL transmission 3 since it is a new transmission not associated with a periodic transmission.

The Rx UE could determine whether a SL transmission is associated with a set of (periodic) SL resources at least based on a previously received SCI. The Rx UE may not (re) start the timer in response to a PSCCH indicating a new transmission if the timing of the PSCCH is indicated by a previously received SCI (via PSCCH). The Rx UE may (re) start the timer in response to a PSCCH indicating a new transmission if the timing of the PSCCH is not indicated by a previously received SCI (via PSCCH).

Additionally or alternatively, the Rx UE may not start or restart the timer in response to a SCI if the SCI is received on a same SL resource (e.g. same frequency range, and/or same starting frequency location) as a previous SCI. The Rx UE may start or restart the timer in response to a SCI if the SCI is not received on a same SL resource (e.g. same frequency range, and/or same starting frequency location) as a previous SCI. Additionally or alternatively, the Rx UE may not (re) start the timer in response to a SCI if the SCI indicates a same SL resource (e.g. same frequency range and/or resources, and/or same starting frequency location) for PSSCH reception as a previous SCI. The Rx UE may (re) start the timer in response to a SCI if the SCI does not indicate a same SL resource (e.g. same frequency range and/or resources, and/or same starting frequency location) for PSSCH reception as a previous SCI.

Additionally or alternatively, the Rx UE may not start or restart the timer in response to a SCI if the SCI indicates a non-zero resource reservation periodicity. The Rx UE could start or restart the timer in response to a SCI if the SCI indicates a zero resource reservation periodicity. The Rx UE could start a timer in response to dynamic or one-shot SL transmission to monitor sidelink control channel for potential or possible subsequent new transmission (from the Tx UE). Additionally or alternatively, the Rx UE could determine whether to start or restart the timer in response to the SCI at least based on information indicated in the SCI. The information could indicate a resource reservation periodicity. The information could indicate whether or not to start or restart the timer. The information may not be a new data indicator (NDI). Additionally or alternatively, the Rx UE could determine whether to start or restart a timer in response to the SCI based on the information and the NDI in the SCI. The Rx UE may not start or restart the timer if the NDI of the SCI indicates a new transmission and the information indicates not to start or restart the timer.

Additionally or alternatively, the Rx UE may not start or restart the timer in response to a SCI if the timing resource of the SCI is indicated by a previous SCI. The time gap between the timing of the SCI and the timing of the previous SCI is the same as the indicated resource reservation periodicity in the previous SCI. The frequency resource of the SCI is the same as the frequency resource of the previous SCI. The indicated or scheduled SL resource of the SCI is the same, in frequency domain, as the indicated or scheduled SL resource of the previous SCI. The Rx UE may start or restart the timer in response to a SCI if the timing resource of the SCI is not indicated by a previous SCI.

Additionally or alternatively, the Rx UE could determine whether to start or restart the timer in response to a SCI based on whether the Rx UE is in active time or not when receiving the SCI. The Rx UE could start or restart the timer if the Rx UE is in active time when receiving the SCI. The Rx UE may not start or restart the timer if the Rx UE is not in active time.

Additionally or alternatively, the Rx UE could determine whether a SCI received at a timing is associated with a set of (periodic) SL resources for transmissions of multiple TBs at least based on a value of a field indicated in the SCI. The field of the SCI could indicate a reserved period (e.g. an offset or a periodicity). Furthermore, the field could indicate a (future) reserved SL resource for delivering different TB. The Rx UE could determine the SCI is associated with a set of SL resources for transmitting multiple TBs if the field has a value not equal to zero. Additionally or alternatively, the Rx UE could determine whether the SCI received at the timing is associated with a set of SL resources for transmissions of multiple TBs based on a field of a previous SCI. If the field of the previous SCI indicates a reserved period and the Rx UE could derive the timing at least based on the reserved period, the Rx UE could determine the SCI is associated with (periodic) SL resources associated with multiple TBs.

If the field indicating reserved period in the SCI has a value zero, and no reserved periods indicated in previous SCIs could derive the timing associated with the SCI, the Rx UE could determine the SCI is associated with a SL resource of transmission of a single TB. The timer could be inactivity timer for DRX for SL (e.g. drx-InactivityTimerSL).

Another general concept of the invention is that a UE could determine to start or restart which timer when receiving a signaling indicating a new sidelink transmission at least based on whether the new sidelink transmission is associated with a set of (periodic) SL resources for transmissions of multiple TBs. The UE may start or restart a second timer if the new sidelink transmission is associated with a set of (periodic) SL resources for transmission of multiple TBs. The UE could start or restart a first timer if the new sidelink transmission is associated with a SL resource for a single TB (e.g. a one-shot transmission).

The set of SL resources for transmission of multiple TBs could be associated with configured grant type-1 or type-2. Furthermore, the set of SL resources for transmission of multiple TBs could be associated with autonomous resource selection.

The Rx UE could determine whether a SL transmission is associated with a set of (periodic) SL resources at least based on a previously received SCI. The Rx UE may (re) start the second timer in response to a PSCCH indicating a new transmission if the timing of the PSCCH is indicated by a previously received SCI (via PSCCH). The Rx UE may (re) start the first timer in response to a PSCCH indicating a new transmission if the timing of the PSCCH is not indicated by a previously received SCI (via PSCCH).

Additionally or alternatively, the Rx UE may start or restart the second timer in response to a SCI if the SCI is received on a same SL resource (e.g. same frequency range, and/or same starting frequency location) as a previous SCI. The Rx UE may start or restart the first timer in response to a SCI if the SCI is not received on a same SL resource (e.g. same frequency range, and/or same starting frequency location) as a previous SCI. Additionally or alternatively, the Rx UE may (re) start the second timer in response to a SCI if the SCI indicates a same SL resource (e.g. same frequency range and/or resources, and/or same starting frequency location) for PSSCH reception as a previous SCI. The Rx UE may (re) start the first timer in response to a SCI if the SCI does not indicate a same SL resource (e.g. same frequency range and/or resources, and/or same starting frequency location) for PSSCH reception as a previous SCI.

Additionally or alternatively, the Rx UE may start or restart the second timer in response to a SCI if the SCI indicates a non-zero resource reservation periodicity. Additionally or alternatively, the Rx UE may start or restart the second timer in response to a SCI if the timing resource of the SCI is indicated by a previous SCI. The time gap between the timing of the SCI and the timing of the previous SCI is the same as the indicated resource reservation periodicity in the previous SCI. The frequency resource of the SCI is the same as the frequency resource of the previous SCI. The indicated/scheduled SL resource of the SCI is the same, in frequency domain, as the indicated/scheduled SL resource of the previous SCI. The Rx UE may start or restart the first timer in response to a SCI if the timing resource of the SCI is not indicated by a previous SCI.

In one embodiment, the second timer could be a second inactivity timer for DRX for SL SPS (reserved) resource or periodic (reserved) resource. The first timer could be a first inactivity timer for DRX for SL (rather than DRX for SL SPS resource). The length of the second timer could be smaller than the length of the first timer. Alternatively, the length of the second timer could be larger than or equal to the length of the first timer. In one embodiment, since previous received SCI from a TX UE could indicate (exactly) a reserved SL resource, length of the second timer could be different from the length of first timer.

For all Concepts and Examples Above

The (first) sidelink information could be indicated in a SCI. The (first) sidelink information could include an offset associated with a timing of the SCI. The first sidelink transmission could contain (receiving) a control information (e.g. SCI) via sidelink control channel (e.g. PSCCH). The first sidelink transmission could also contain (receiving) a transport block (TB) via sidelink data channel (PSSCH).

The new sidelink transmission may not be a retransmission of a TB. The Rx UE may not monitor the sidelink control channel at a timing if the timing is not associated with a SL resource or a SL control channel reception. The Rx UE could be in active time when receiving a SCI indicating a new transmission. The Rx UE may not be in active time when receiving a SCI indicating a new transmission. The SCI could be associated with a set of periodic SL resources. The TBs could be associated with MAC PDUs.

The offset could be a reserved period associated with a set of reserved SL resources of the Tx UE (e.g. associated with autonomous resource selection mode). The offset could be associated with a periodicity of a configured grant configuration.

All concepts, examples, and embodiments discussed or described above could be combined into new concept(s).

Figure 10:
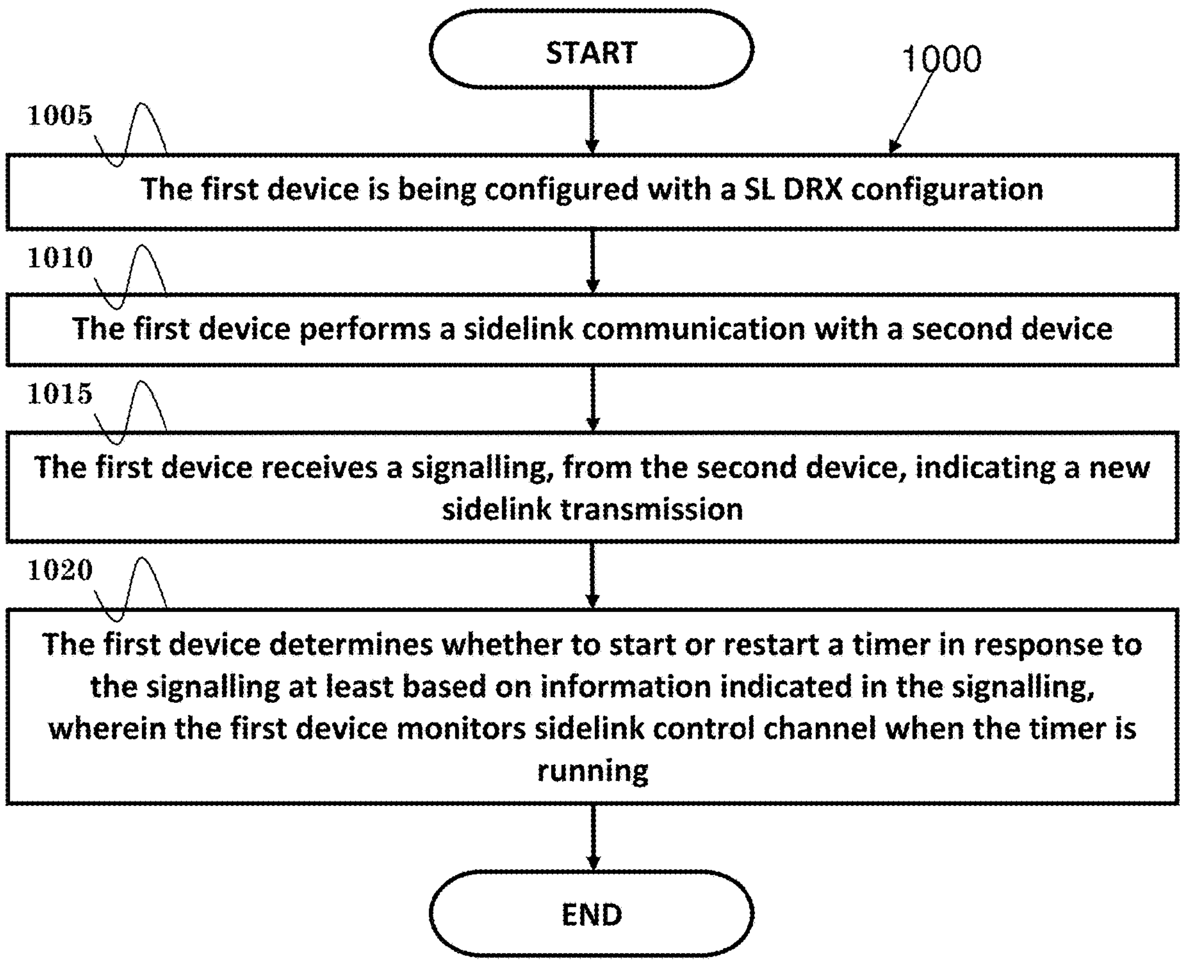
FIG. 10 is a flow chart according to one exemplary embodiment.

FIG. 10 is a flow chart 1000 according to one exemplary embodiment from the perspective of a first device. In step 1005, the first device is being configured with a SL DRX configuration. In step 1010, the first device performs a sidelink communication with a second device. In step 1015, the first device receives a signaling, from the second device, indicating a new sidelink transmission. In step 1020, the first device determines whether to start or restart a timer in response to the signaling at least based on information indicated in the signaling, wherein the first device monitors sidelink control channel when the timer is running.

In one embodiment, the information may be a (value of) reservation period. The first device may not start or restart the timer if the value of the reservation period is a non-zero value. However, the first device may start or restart the timer if the value of the reservation period is zero.

In one embodiment, the information may not be a New data indicator (NDI). The first device may start or restart the timer if the information indicates to start or restart the timer and a NDI in the signalling indicates a new sidelink transmission. If NDI in the signalling indicates a sidelink retransmission, the first device may not start or restart the timer, even if the information indicates to start or restart the timer.

In one embodiment, the signaling could be a Sidelink Control Information (SCI), the signaling is transmitted via Physical Sidelink Control Channel (PSCCH), and/or the signaling is a SCI format with reserved period field. The timer may be at least one of an inactivity timer, an on duration timer, or a retransmission timer for SL DRX, and/or the SL DRX configuration may comprise at least a configuration of the timer.

In one embodiment, the first device may be in active time when the timer is running, wherein the first device monitors sidelink control channel when the first device is in active time.

Referring back to FIGS. 3 and 4, in one exemplary embodiment of a first device, wherein the first device is configured with a SL DRX configuration. The first device 300 includes a program code 312 stored in the memory 310. The CPU 308 could execute program code 312 to enable the first device (i) to perform a sidelink communication with a second device, (ii) to receive a signaling, from the second device, indicating a new sidelink transmission, and (iii) to determine whether to start or restart a timer in response to the signaling at least based on information indicated in the signaling, wherein the first device monitors sidelink control channel when the timer is running. Furthermore, the CPU 308 can execute the program code 312 to perform all of the above-described actions and steps or others described herein.

Figure 11:
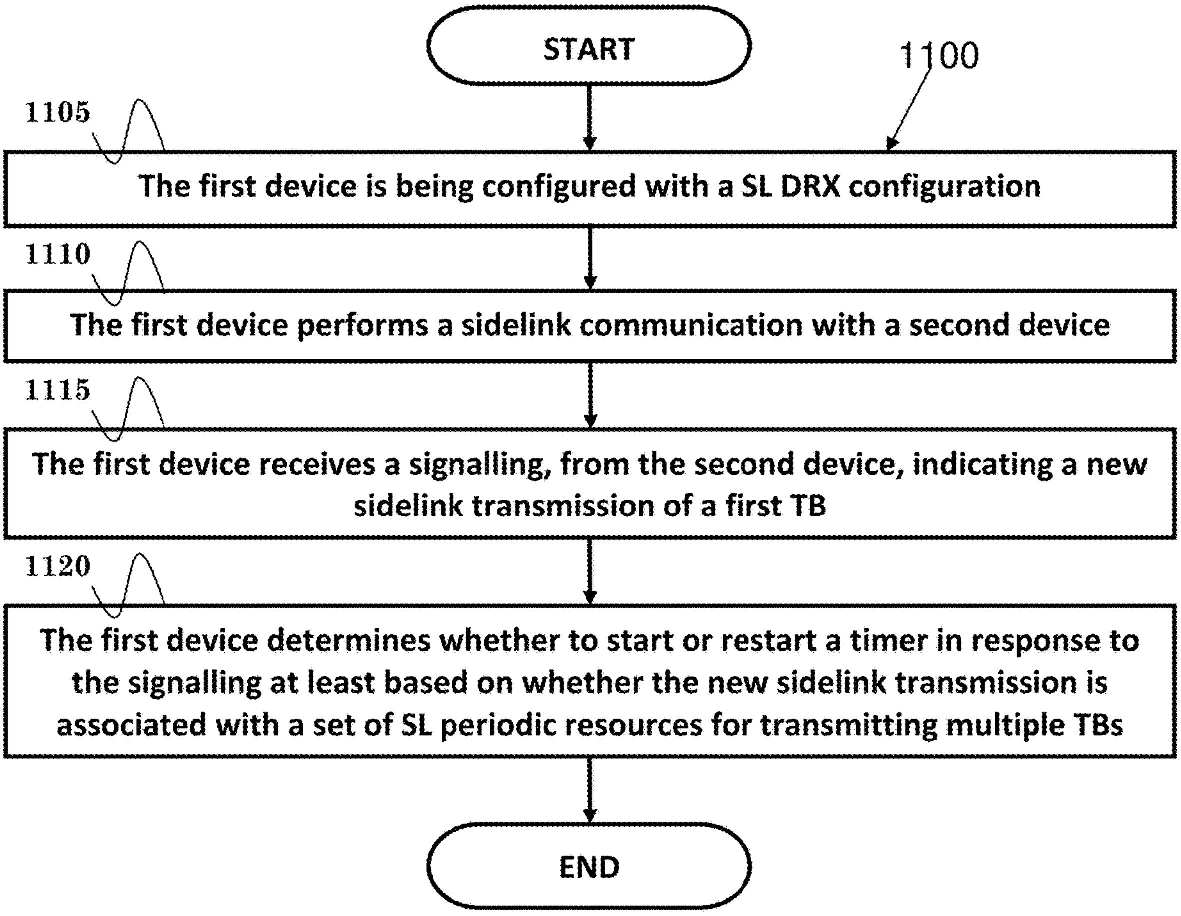
FIG. 11 is a flow chart according to one exemplary embodiment.

FIG. 11 is a flow chart 1100 according to one exemplary embodiment from the perspective of a first device. In step 1105, the first device is being configured with a SL DRX configuration. In step 1110, the first device performs a sidelink communication with a second device. In step 1115, the first device receives a signaling, from the second device, indicating a new sidelink transmission of a TB. In step 1120, the first device determines whether to start or restart a timer in response to the signaling at least based on whether the new sidelink transmission is associated with a set of SL periodic resources for transmitting multiple TBs.

In one embodiment, the first device may start or restart the timer if the signaling is associated with a dynamic or one-shot SL transmission associated with the second device, or if the new sidelink transmission is not associated with the set of SL periodic resources, or if the new sidelink transmission is performed on dynamic or non-periodic sidelink resources, or if the new sidelink transmission is not performed on one of the set of SL periodic resources, or if the first device is not indicated with the set of SL periodic resources from the second device, or if the signaling does not indicate sidelink resource reservation for a second TB. The first device may not start or restart the timer if the new sidelink transmission is associated with the set of SL periodic resources for transmitting multiple TBs, or if the new sidelink transmission is performed on one of the set of SL periodic resources, or if the signaling indicates sidelink resource reservation for a second TB.

In one embodiment, the set of SL periodic resources for transmitting multiple TBs may be selected by the second device via (autonomous) resource selection mode. The set of SL periodic resources for transmitting multiple TBs may be associated with a configured grant configuration of the second device. The set of SL periodic resources for transmitting multiple TBs may also be associated with semi-persistent SL transmission.

In one embodiment, the signaling may be a Sidelink Control Information (SCI), and/or the signaling may be transmitted via Physical Sidelink Control Channel (PSCCH), and/or the signaling may be a SCI format with reserved period field. The timer may be at least one of an inactivity timer, an on duration timer, or a retransmission timer for SL DRX, and/or the SL DRX configuration may comprise at least a configuration of the timer.

In one embodiment, the first device may be in active time when the timer is running, wherein the first device monitors sidelink control channel when the first device is in active time. The second device may indicate the set of SL periodic resources to the first device, and/or the signaling may indicate the set of SL periodic resources.

Referring back to FIGS. 3 and 4, in one exemplary embodiment of a first device, wherein the first device is being configured with a SL DRX configuration. The first device 300 includes a program code 312 stored in the memory 310. The CPU 308 could execute program code 312 to enable the first device (i) to perform a sidelink communication with a second device, (ii) to receive a signaling, from the second device, indicating a new sidelink transmission of a first TB, and (iii) to determine whether to start or restart a timer in response to the signaling at least based on whether the new sidelink transmission is associated with a set of SL periodic resources for transmitting multiple TBs. Furthermore, the CPU 308 can execute the program code 312 to perform all of the above-described actions and steps or others described herein.

Figure 12:
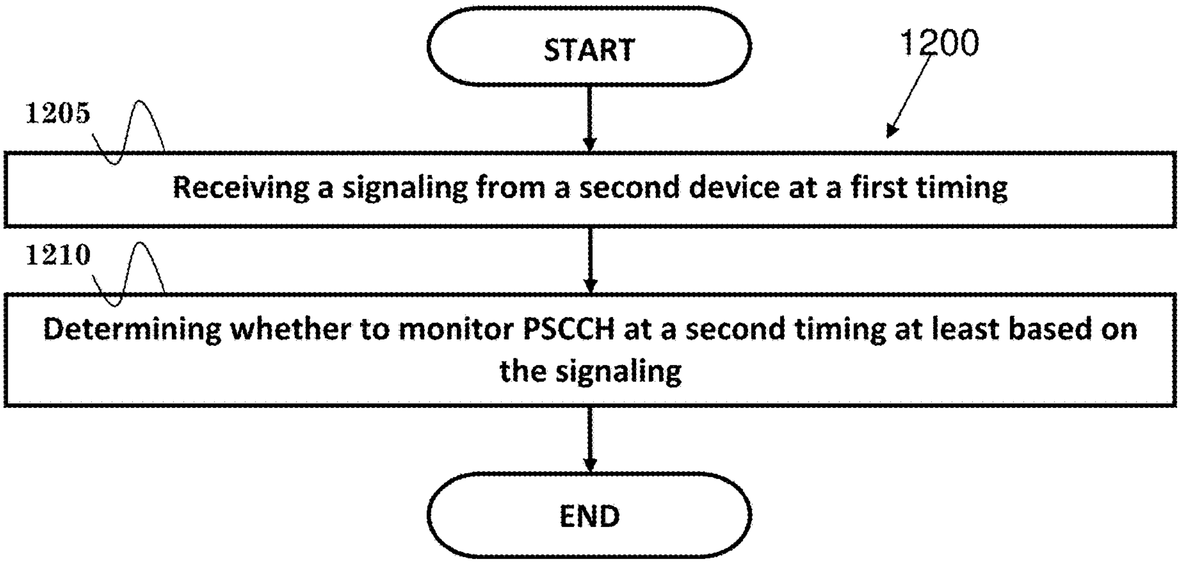
FIG. 12 is a flow chart according to one exemplary embodiment.

FIG. 12 is a flow chart 1200 according to one exemplary embodiment from the perspective of a first device. In step 1205, the first device receives a signaling from a second device at a first timing. In step 1210, the first device determines whether to monitor PSCCH at a second timing at least based on the signaling.

In one embodiment, the first device may derive the second timing based on information indicated in the signaling. The signaling may be associated with one of a set of SL resources for transmissions of multiple TBs. The information indicated in the signaling may contain an offset or reserved period with respect to the first timing and the first device derives the second timing based on the offset or reserved period with respect to the first timing.

In one embodiment, the first device may not be in active time at the second timing. Alternatively, the first device may be in active time at the second timing. The first device may consider (itself) to be in active time at the second timing in response to the signaling.

Referring back to FIGS. 3 and 4, in one exemplary embodiment of a first device. The first device 300 includes a program code 312 stored in the memory 310. The CPU 308 could execute program code 312 to enable the first device (i) to receive a signaling from a second device at a first timing, and (ii) to determine whether to monitor PSCCH at a second timing at least based on the signaling. Furthermore, the CPU 308 can execute the program code 312 to perform all of the above-described actions and steps or others described herein.

Figure 13:
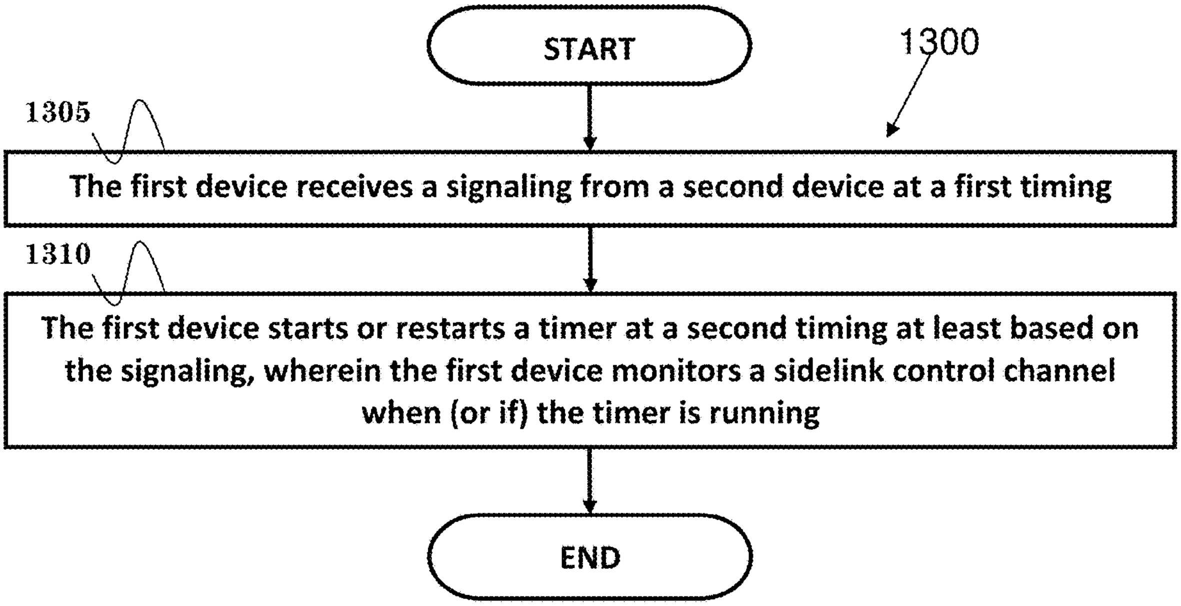
FIG. 13 is a flow chart according to one exemplary embodiment.

FIG. 13 is a flow chart 1300 according to one exemplary embodiment from the perspective of a first device. In step 1305, the first device receives a signaling from a second device at a first timing. In step 1310, the first device starts or restarts a timer at a second timing at least based on the signaling, wherein the first device monitors a sidelink control channel when (or if) the timer is running.

In one embodiment, the second timing may be different from the first timing and the timing difference between the first timing and the second timing may be indicated in the signaling.

Referring back to FIGS. 3 and 4, in one exemplary embodiment of a first device. The first device 300 includes a program code 312 stored in the memory 310. The CPU 308 could execute program code 312 to enable the first device (i) to receive a signaling from a second device at a first timing, and (ii) to start or restart a timer at a second timing at least based on the signaling, wherein the first device monitors a sidelink control channel when (or if) the timer is running. Furthermore, the CPU 308 can execute the program code 312 to perform all of the above-described actions and steps or others described herein.

Figure 14:
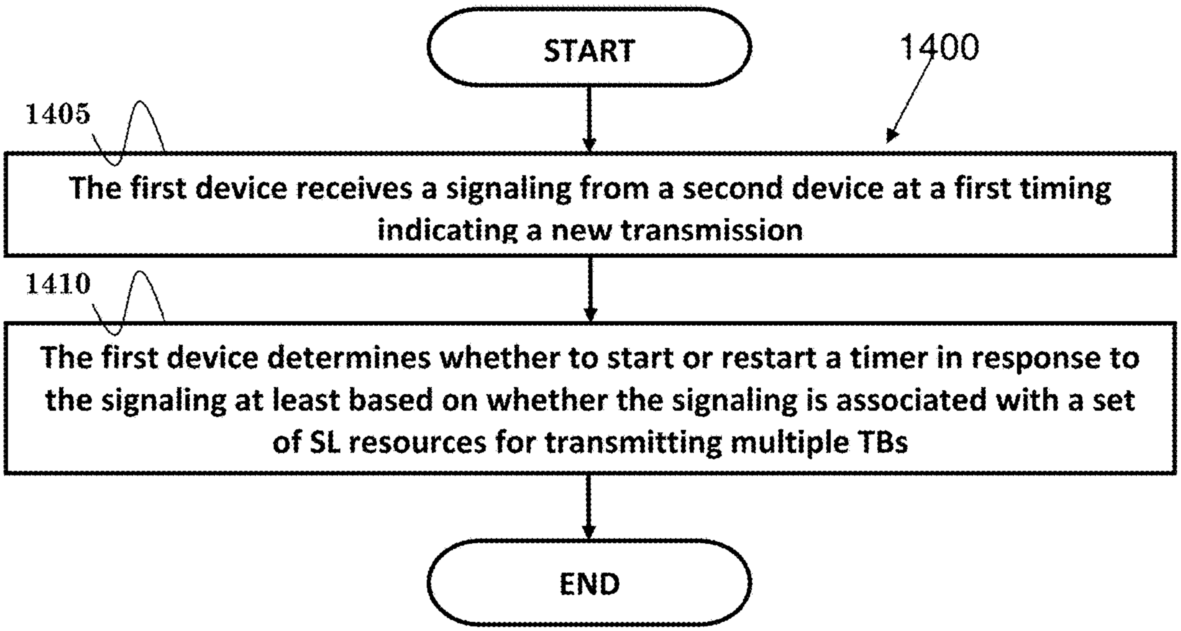
FIG. 14 is a flow chart according to one exemplary embodiment.

FIG. 14 is a flow chart 1400 according to one exemplary embodiment from the perspective of a first device. In step 1405, the first device receives a signaling from a second device at a first timing indicating a new transmission. In step 1410, the first device determines whether to start or restart a timer in response to the signaling at least based on whether the signaling is associated with a set of SL resources for transmitting multiple TBs.

In one embodiment, the first device may not start or restart the timer if the signaling indicating the new transmission is associated with a set of SL resources for transmitting multiple TBs. However, the first device may start or restart the timer if the signaling is associated with a SL resource for transmitting a single TB. Furthermore, the first device may start or restart the timer if the signaling is associated with dynamic or one-shot SL transmission associated with the second device.

In one embodiment, the set of SL resources for transmitting multiple TBs may be periodic resources. The set of SL resources for transmitting multiple TBs may be selected by the second device via autonomous resource selection mode. The set of SL resources for transmitting multiple TBs may be associated with a RRC configuration of the second device (e.g. SL-CGconfig). Furthermore, the set of SL resources for transmitting multiple TBs may be associated with semi-persistent SL transmission.

Referring back to FIGS. 3 and 4, in one exemplary embodiment of a first device. The first device 300 includes a program code 312 stored in the memory 310. The CPU 308 could execute program code 312 to enable the first device (i) to receive a signaling from a second device at a first timing indicating a new transmission, and (ii) to determine whether to start or restart a timer in response to the signaling at least based on whether the signaling is associated with a set of SL resources for transmitting multiple TBs. Furthermore, the CPU 308 can execute the program code 312 to perform all of the above-described actions and steps or others described herein.

Figure 15:
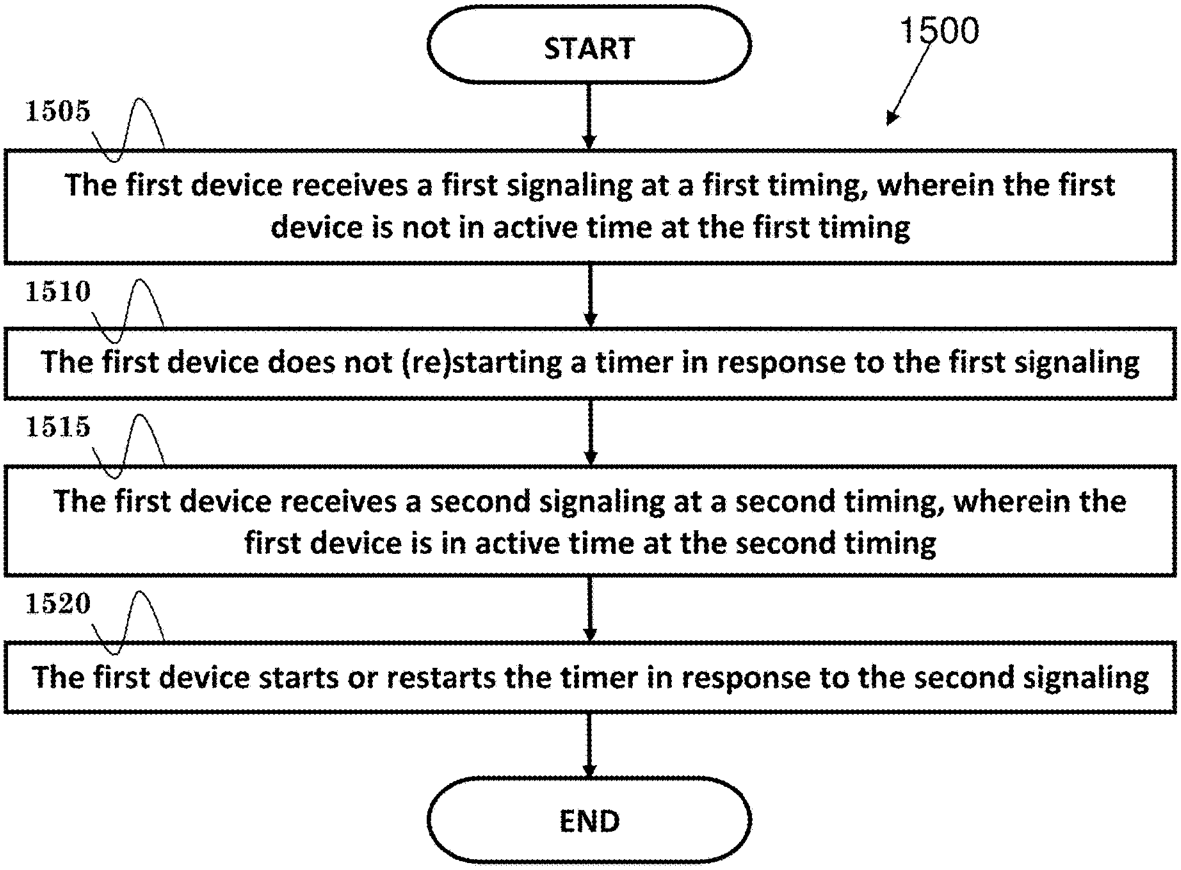
FIG. 15 is a flow chart according to one exemplary embodiment.

FIG. 15 is a flow chart 1500 according to one exemplary embodiment from the perspective of a first device. In step 1505, the first device receives a first signaling at a first timing, wherein the first device is not in active time at the first timing. In step 1510, the first device does not (re) starting a timer in response to the first signaling. In step 1515, the first device receives a second signaling at a second timing, wherein the first device is in active time at the second timing. In step 1520, the first device starts or restarts the timer in response to the second signaling.

In one embodiment, the first signaling may be associated with a (periodic) set of SL resources for transmissions of multiple TBs. The first device may determine whether to start or restart the timer at a timing in response to receiving the signaling at least based on whether the first device is in active time at the timing. The signaling may be a SCI. In particular, the signaling may be a SCI indicating a new transmission.

In one embodiment, the timer may be at least one of an inactivity timer for DRX, an on duration timer for DRX, or a retransmission timer for DRX.

In one embodiment, the first device may perform unicast communication with the second device. The first device may perform groupcast communication with the second device. The first device may determine the SCI is associated with a set of SL resource for transmitting multiple TBs if a field indicating reserved period (or offset) in the SCI is not zero. The first device may determine the SCI is associated with a set of SL resource for transmitting multiple TBs if a field indicating reserved period (or offset) in a previous SCI is not zero, and the first device could derive the timing of the SCI at least based on the reserved period in the previous SCI.

In one embodiment, the first and/or the second device may be in active time when at least one of the timer is running.

Referring back to FIGS. 3 and 4, in one exemplary embodiment of a first device. The first device 300 includes a program code 312 stored in the memory 310. The CPU 308 could execute program code 312 to enable the first device (i) to receive a first signaling at a first timing, wherein the first device is not in active time at the first timing, (ii) to not (re) starting a timer in response to the first signaling, (iii) to receive a second signaling at a second timing, wherein the first device is in active time at the second timing, and (iv) to start or restart the timer in response to the second signaling. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device with a Sidelink (SL) Discontinuous Reception (DRX) configuration, comprising:

performing a sidelink communication with a second device;

receiving, from the second device via a first Physical Sidelink Control Channel (PSCCH) and a first Physical Sidelink Shared Channel (PSSCH), a first scheduling Sidelink Control Information (SCI) at a first timing scheduling a first new sidelink transmission for a first Transport Block (TB) via the first PSSCH at the first timing, wherein the first scheduling SCI comprises a resource reservation period bit field to indicate a timing information, and wherein the timing information is a resource reservation period or a timing offset with respect to the first timing;

determining whether to start or restart a timer based on at least information in the first scheduling SCI and a New Data Indicator (NDI) in the first scheduling SCI indicating the first new sidelink transmission, wherein the first device monitors SCI when the timer is running;

considering, in response to the first scheduling SCI which schedules the first new sidelink transmission for the first TB via the first PSSCH at the first timing, a second timing to be active time of the first device, wherein the second timing is derived based on the timing information from the first scheduling SCI and the first timing;

receiving, in response to the first scheduling SCI, the first TB at the first timing;

monitoring SCI at the second timing based on the timing information from the first scheduling SCI;

receiving a second scheduling SCI via a second PSCCH and a second PSSCH at the second timing, wherein the second SCI schedules a second sidelink transmission, separate from the first new sidelink transmission, for a second TB via the second PSSCH at the second timing; and receiving, in response to the second scheduling SCI, the second TB at the second timing.

2. The method of claim 1, wherein the SCI is transmitted via PSCCH and PSSCH.

3. The method of claim 1, wherein the SCI is associated with a set of periodic SL resources, and/or the set of periodic SL resources are for transmitting multiple TBs.

4. The method of claim 1, wherein the SCI indicates a reserved resource for new transmission of a TB at the second timing.

5. The method of claim 1, wherein the first device monitors SCI and PSCCH at the second timing.

6. The method of claim 1, wherein the first device receives a first sidelink TB or sidelink Medium Access Control (MAC) Protocol Data Unit (PDU) from the second device at the first timing and receives a second sidelink TB or sidelink MAC PDU from the second device at the second timing.

7. The method of claim 1, wherein the first device monitors the SCI at the second timing regardless of whether an inactivity timer, an on duration timer, or a retransmission timer for SL DRX associated with the SL DRX configuration is running or not.

8. The method of claim 1, wherein the timing information is indicated as a non-zero value.

9. The method of claim 1, wherein the timing information indicates a reserved SL resource for delivering a TB.

10. A first device with a Sidelink (SL) Discontinuous Reception (DRX) configuration, comprising:

a processor; and a memory operatively coupled to the processor, wherein the processor is configured to execute a program code to:

perform a sidelink communication with a second device;

receive, from the second device via a first Physical Sidelink Control Channel (PSCCH) and a first Physical Sidelink Shared Channel (PSSCH), a first scheduling Sidelink Control Information (SCI) at a first timing scheduling a first new sidelink transmission for a first Transport Block (TB) via the first PSSCH at the first timing, wherein the first scheduling SCI comprises a resource reservation period bit field to indicate a timing information, wherein the timing information is a resource reservation period or a timing offset with respect to the first timing;

determine whether to start or restart a timer based on at least information in the first scheduling SCI and a New Data Indicator (NDI) in the first scheduling SCI indicating the first new sidelink transmission, wherein the first device monitors SCI when the timer is running;

consider, in response to the first scheduling SCI which schedules the first new sidelink transmission for the first TB via the first PSSCH at the first timing, a second timing to be active time of the first device, wherein the second timing is derived based on the timing information from the first scheduling SCI and the first timing;

receive, in response to the first scheduling SCI, the first TB at the first timing;

monitor SCI at the second timing based on the timing information from the first scheduling SCI;

receive a second scheduling SCI via a second PSCCH and a second PSSCH at the second timing, wherein the second scheduling SCI schedules a second sidelink transmission, separate from the first new sidelink transmission, for a second TB via the second PSSCH at the second timing; and receive, in response to the second scheduling SCI, the second TB at the second timing.

11. The first device of claim 10, wherein the SCI is transmitted via PSCCH and PSSCH.

12. The first device of claim 10, wherein the SCI is associated with a set of periodic SL resources, and/or the set of periodic SL resources is for transmitting multiple TBs.

13. The first device of claim 10, wherein the SCI indicates a reserved resource for a new transmission of a TB at the second timing.

14. The first device of claim 10, wherein the processor is further configured to execute the program code to:

monitor SCI and PSCCH at the second timing.

15. The first device of claim 10, wherein the processor is further configured to execute the program code to:

receive a first sidelink TB or sidelink Medium Access Control (MAC) Protocol Data Unit (PDU) from the second device at the first timing and receives a second sidelink TB or sidelink MAC PDU from the second device at the second timing.

16. The first device of claim 10, wherein the first device monitors the SCI at the second timing regardless of whether an inactivity timer, an on duration timer, or a retransmission timer for SL DRX associated with the SL DRX configuration is running or not.

17. The first device of claim 10, wherein the timing information is indicated as a non-zero value.

18. The first device of claim 10, wherein the timing information indicates a reserved SL resource for delivering a TB.

* * * * *